US006664788B2

(12) United States Patent
Hornbostel et al.

(10) Patent No.: US 6,664,788 B2
(45) Date of Patent: Dec. 16, 2003

(54) NONLINEAR ELECTROSEISMIC EXPLORATION

(75) Inventors: Scott C. Hornbostel, Houston, TX (US); Arthur H. Thompson, Houston, TX (US); Thomas C. Halsey, Annandale, NJ (US); Robert A. Raschke, Houston, TX (US); Clint A. Davis, Bellaire, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/127,277

(22) Filed: Apr. 22, 2002

(65) Prior Publication Data

US 2002/0181326 A1 Dec. 5, 2002

Related U.S. Application Data

(60) Provisional application No. 60/288,059, filed on May 2, 2001.

(51) Int. Cl.[7] .............................. G01V 1/00; G01V 3/02; G01V 3/38; G01V 11/00; G01V 1/40
(52) U.S. Cl. ...................... 324/323; 324/354; 324/359; 367/14; 702/14; 181/106; 181/122
(58) Field of Search ................................ 324/323, 344, 324/347, 354, 357, 359, 360; 367/14, 38, 40; 181/102, 106, 122; 323/282; 327/105; 702/14, 17

(56) References Cited

U.S. PATENT DOCUMENTS 3,679,978 A 7/1972 Hopkins, Jr. ............... 325/187
4,207,772 A 6/1980 Stoller ........................ 73/620
4,295,213 A 10/1981 Mifsud ........................ 367/41
4,467,283 A 8/1984 Owen et al. ................ 324/363
5,841,280 A 11/1998 Yu et al. ..................... 324/323
5,877,995 A 3/1999 Thompson et al. .......... 367/14
6,014,323 A 1/2000 Aiello et al. ................. 363/71
6,477,113 B2 11/2002 Hornbostel et al. .......... 367/38

FOREIGN PATENT DOCUMENTS

WO WO 91/06854 5/1991

OTHER PUBLICATIONS

Corson, D. R. and Lorrain, P., *Introduction to Electromagnetic Fields and Waves*, W. H. Freeman & Co., 1962, pp. 119–120.

(List continued on next page.)

*Primary Examiner*—Gerard R. Strecker
(74) *Attorney, Agent, or Firm*—J. Paul Plummer

(57) ABSTRACT

A method for seismic exploration using nonlinear conversions between electromagnetic and seismic energy, with particular attention to the electromagnetic source waveform used. According to the invention, seismic returns from a source waveform are correlated with a reference waveform, with both waveforms custom designed to minimize both correlation side lobes and interference from linear electroseismic effects. A waveform element is selected which may be sequenced by a binary or similar digital code embodying the desired custom design to generate an input sweep with the needed depth penetration and noise suppression. Correlation of the seismic response with the reference waveform in a data processing step mathematically aggregates the seismic response from the input sweep into a single wavelet. Preferred binary digital codes include prescribed variations of maximal length shift-register sequences. Also, an apparatus for generating the desired waveforms.

29 Claims, 11 Drawing Sheets

OTHER PUBLICATIONS

*Digital Communications with Space Applications*, pp. 1–20, 165–167, Solomon W. Golomb, editor, Prentice–Hall, Inc. (1964).

Zierler, Neal, "Linear Recurring Sequences", *J. Soc. Indust. Appl. Math.*, vol. 7 (1), pp. 31–48 (1959).

Cunningham, Allen B., "Some Alternate Vibrator Signals", *Geophysics*, vol. 44 (12), pp. 1901–1921, (1979).

Duncan, P. M. et al, "The Development and Applications of a Wide Band Electromagnetic Sounding System Using a Pseudo–Noise Source", *Geophysics*, vol. 45 (8), pp. 1276–1296, (Aug. 1980).

Foster, M. R. et al., "The Use of Pseudonoise Sequences to Code a Pulsed Neutron Logging Source," *Geophysics*, vol. 37 (3), pp. 481–487, (Jun. 1972).

Keller, George V. et al., "Megasource Time–Domain Electromagnetic Sounding Methods", *Geophysics*, vol. 49 (7), Jul. 1984) pp. 993–1009.

Kounias, S. et al., "Seismic Data Processing", *Society of Exploration Geophysicists*, pp. 18–19, (1987).

Tilsley, J. E. et al., "Very Low Frequency Electromagnetic Surveying for Geological Structures Using a Portable Signal Generator", *Trans. Instn. Min. Metall.*, Section B, pp. B74–B77, Feb. 1976.

*Handbook of Physical Constants*, p. 571, Sydney P. Clark, Jr., editor, The Geological Society of America (1966).

Kounias, S. et al., "On Golay Sequences", *Discrete Mathematics 92*, (1991), pp. 177–185.

Chernyak, G.Y.A. (1976) "The Physical Nature of the Seismoelectric Effect in Rocks", *Izv. Earth Physics*, No. 2, pp. 108–112.

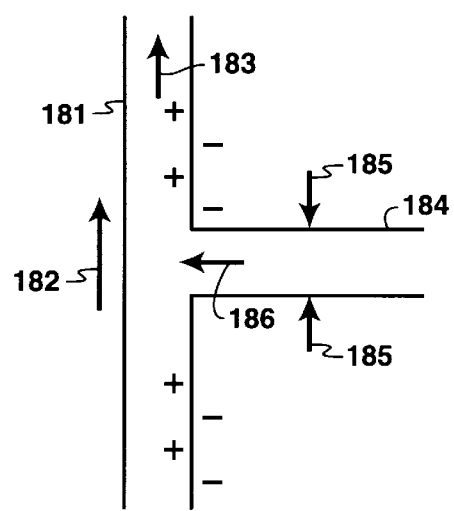 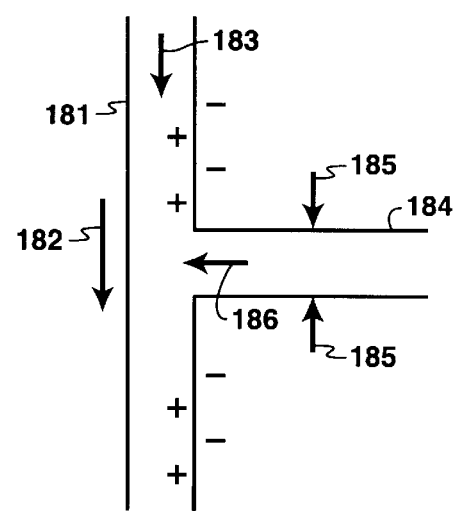
FIG. 18A     FIG. 18B

NONLINEAR ELECTROSEISMIC EXPLORATION

This application claims the benefit of U.S. Provisional Application No. 60/288,059 filed May 2, 2001.

FIELD OF THE INVENTION

This invention relates to the field of geophysical prospecting. More particularly, the invention describes methods for use in electroseismic exploration utilizing nonlinear electroseismic conversion mechanisms.

BACKGROUND OF THE INVENTION

The electroseismic method is a geophysical prospecting tool aimed at creating images of subsurface formations using conversions between electromagnetic and seismic energy, as described in U.S. Pat. No. 5,877,995 (Thompson and Gist). The essence of the electroseismic method is that high levels of electrical energy are transmitted into the ground at or near the surface, and the electrical energy is converted to seismic energy by the interaction of underground fluids, including hydrocarbons, with the rock matrix. The seismic waves are detected at or near the surface by seismic receivers.

In electroseismic exploration, it is generally impractical to deliver to the ground a single pulse containing enough electrical energy to produce an acceptable seismic return. Therefore, in electroseismic prospecting, the input electrical signal should preferably be a controlled wavetrain of predetermined length. A similar problem exists in conventional seismic exploration when a seismic vibrator is used as the seismic source instead of an explosive device. The seismic vibrator generates a controlled wavetrain (known as a sweep) which is injected into the earth. This wavetrain reflects from subsurface reflectors and the reflected wavetrain is recorded by seismic detectors located at or near the surface of the earth. The recorded wavetrain represents the input wavetrain convolved with the impulse response of the earth. In order to consolidate the seismic energy in the recorded wavetrain, and to observe underground reflection events relative to a time zero in the manner afforded by a single explosion source, a data processing step is employed in which the recorded seismic data are correlated with a reference wavetrain. Persons skilled in the art will understand the process of correlating two waves. (See, for example, *Seismic Data Processing*, O. Yilmaz, Society of Exploration Geophysicists (1987), pp. 18–19.) Electroseismic data are also processed using a similar correlation step.

It is known that the reference waveform used for the correlation should resemble the waveform of the expected seismic return. In the case of conventional seismic, the seismic response is linear, i.e., the output signal is proportional to the input signal to the first power. Hence the vibrator sweep wavetrain itself is a preferable reference waveform to use to correlate vibrator data. Electroseismic conversion also occurs as a linear process in which case the preferable reference waveform for correlation is often the source waveform. Selection of source waveforms and associated reference waveforms for linear electroseismic exploration is the subject of U.S. patent application Ser. No. 09/809,472 by Hornbostel and Thompson, published Sep. 27, 2001 with publication number WO 01/71386.

When a source waveform is correlated with its associated reference, a large peak will typically result at the onset time of the waveform surrounded by lower peaks at earlier and later times. (See patent publication WO 01/71386). These lower peaks are called correlation side lobes. They are undesirable because they provide no additional information and they can mask smaller desired returns.

An effective input current source for electroseismic exploration must have the following characteristics (see the aforementioned Patent Application):

The source should produce large current levels over extended time.

The source should have high electrical efficiency.

The source should contain little or no DC to avoid plating the electrode array.

The frequency content of the source should be adequate for the exploration needs.

The correlation of the source waveform with its reference should have sufficiently low side lobe levels.

Electroseismic prospecting holds great promise as a geophysical exploration tool. However, the utility of electroseismic prospecting may be enhanced by increasing the amount and types of information made available to an explorationist from an electroseismic prospecting operation. The present invention provides one method of doing so.

SUMMARY OF THE INVENTION

In some embodiments, the present invention is a method for nonlinear electroseismic prospecting comprising the steps of (a) selecting a source waveform of predetermined length, (b) generating an electrical signal based on the source waveform, (c) transmitting the electrical signal into the ground, (d) detecting and recording the seismic signals resulting from conversion of the electrical signal to seismic energy in subterranean formations, and (e) correlating the resulting seismic signals with a reference waveform to produce a correlated seismic record that simulates the result that would be produced by a single-pulse source aggregating all of the energy of the input sweep. The reference waveform is selected in conjunction with the source waveform to satisfy at least two criteria: (1) when the square of the source waveform (representing the nonlinear electroseismic return) is cross-correlated with the reference waveform, side lobes are reduced in amplitude to an acceptable level; and (2) when the source waveform is cross-correlated with the reference waveform (representing the linear electroseismic return), the resulting unwanted waveform's interference with the desired correlation (the correlation of the square of the source waveform) is reduced to an acceptable level.

In some embodiments of the present invention, the source waveform is constructed from individual cycles of a 60-cycles/sec (Hz) sine wave, i.e., standard AC electrical power, with the polarity of some such cycles inverted as governed by a digital code. The digital code is the means by which the source wave is custom designed, using specific techniques taught herein, to satisfy the two above-enumerated criteria. Where deeper penetration of the subsurface is desired, another embodiment of the present invention constructs frequencies lower than 60 Hz by switching between the three phases of a 3-phase power source.

In preferred embodiments of the invention, the digital codes are sequences of ones, zeros, and/or negative ones, constructed according to the teachings of the invention with the starting point being a maximal length shift-register sequence. The length of such a sequence can be increased as a further means of side lobe reduction. Circular correlation with the corresponding, custom designed reference sequence is the preferred means of correlation in step (e) above for the above-described source sequences used in the preferred embodiments.

A person skilled in the art will often be able to examine the electroseismic results from the present inventive method and, from the seismic amplitudes, predict which regions contain hydrocarbons.

A preferred apparatus for generating the required waveforms is also disclosed.

BRIEF DESCRIPTION OF THE DRAWINGS

The present invention and its advantages will be better understood by referring to the following detailed description and the attached drawings in which:

FIGS. 18A and 18B illustrate forces caused by reversing an external electric field on a typical pore structure.

Figure 1A:
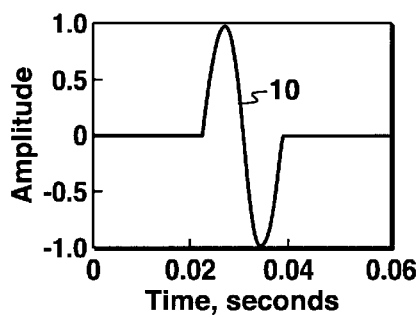
FIG. 1A illustrates a 60 Hz waveform element.

The amplitude (vertical) scales on the graphs in FIGS. 1–8 are arbitrary, usually normalized to unity for the first graph in a sequence.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is an alternative method for electroseismic prospecting for oil and gas.

The previously known electroseismic prospecting method, as described above, looks to detect a seismic response proportional to the input electrical signal and occurring at the same frequency as the input signal (i.e., a "linear" response). In contrast, the phenomenon of electrostriction is an example of a mechanism in which matter is deformed by an electric field independent of a reversal of the field direction. Such a deformation is proportional to the square of the field intensity (i.e., a "non-linear" response). See, for example, D. R. Corson and P. Lorrain, *Introduction to Electromagnetic Fields and Waves*, W. H. Freeman & Co. (1962) page 120. Electrostriction has never been seriously proposed as a means for geophysical prospecting, probably at least in part because the effect was presumed to be too small to produce usable signals. Other mechanisms may also contribute to a non-linear response. According to the present invention, electrostriction and other non-linear mechanisms will not only generate a seismic signal, but the seismic signal can be comparable in magnitude in typical moist rock formations to conventional seismic waves, just as linear electroseismic responses can be.

The deployment of equipment in the field will be the same for nonlinear electroseismic prospecting as it is for linear electroseismic prospecting. The field layout is explained below, and more information can be found in U.S. Pat. No. 5,877,995. The equipment used will be the same with the possible exception of the seismic receivers. The receivers must have good response at twice the input signal frequency rather than at the input frequency, as is the case for linear electroseismic. This is because the effect of the nonlinear conversion process is to create a seismic response that is proportional to the square of the input electrical field intensity and has a frequency that is double the input frequency.

Since the same field equipment setup that produces linear electroseismic data will also produce nonlinear data, the primary differences in the two prospecting methods arise from the need to devise source and reference waveforms that will (a) detect the desired response and (b) minimize unwanted interference, upon correlation of the seismic response with the reference waveform (which is a data processing step). In the case of nonlinear electroseismic, the unwanted interference is of two types.

As in the case of linear electroseismic, the source and reference waveforms must be custom designed to reduce side lobe amplitude to an acceptable level. These side lobes are one of the two types of interference referred to above. For reasons to be described below, the source and reference waveforms that are preferable for linear electroseismic will strongly attenuate the nonlinear response. Because the reverse of this last statement is unfortunately not true, nonlinear electroseismic prospecting presents the further challenge of needing to have a capability to discriminate against the linear response and interference it can cause with the desired nonlinear response. This is the second type of interference referred to above. The present invention has means for satisfying this need as well as the need to attenuate side lobes.

The source signals taught by the present invention in some of its embodiments are in the class of binary-coded waveforms. A binary-coded waveform consists of a sequence of elements. The individual elements might each be, for example, a single cycle of a 60 Hz sine wave. In fact, waveforms that are made up of such segments of 60 Hz sinusoids (or whatever frequency the local electric utility uses) are particularly economical for the electroseismic case because this source type can be formed using simple switching of commercial powerline signals. These waveform segments are pieced together with polarities specified by a binary sequence. The binary sequence is designed, as explained below, to give minimal side lobes and minimal interference from linear effects, while the waveform element is designed to optimize the frequency content of the source.

Figure 1B:
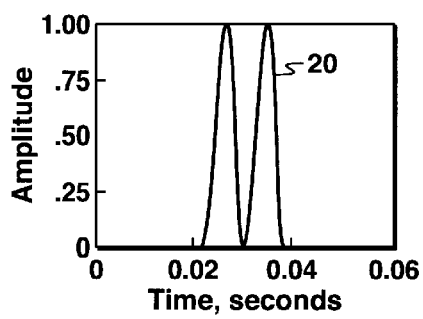
FIG. 1B shows the square of this waveform element.
Figure 2B:
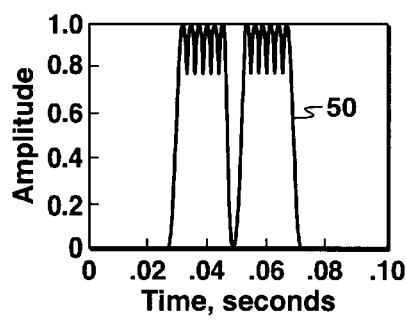
FIG. 2B shows the square of the waveform element of FIG. 2A.

FIG. 1A shows a single cycle 10 of a 60 Hz sinusoid. The square of wave element 10 is shown in FIG. 1B at 20. The effect of squaring a sinusoid can be seen from the trigonometric identity $$\sin^2\theta = \frac{1}{2}(1-\cos 2\theta)$$

Thus, squaring a sinusoid results in another sinusoid (a cosine wave is a sine wave shifted 90°) of double the frequency superimposed on a constant (DC) component (of magnitude ½). (This expression also illustrates that the squaring of the input signal and the doubling of its frequency produced by the nonlinear electroseismic mechanisms are not separate effects.). The DC component will not propagate through the earth to detectors; however, near-zero frequencies will propagate and are less attenuated by the earth than higher frequencies. But, the near-zero frequency electroseismic measured response is very low because the detector efficiency is poor at these frequencies. FIGS. 1–8 in this application, to the extent they are used to illustrate the seismic response, are computer simulations only. To make these simulations realistic, a digital filter is used to eliminate from the correlations the very low frequencies that would not be present in an actual measured electroseismic response because of the reasons discussed above. The autocorrelation of the squared wave 20 is shown at 30 in FIG. 1C after removing the low (DC or nearly DC) frequencies for the reasons stated above.

Waveform element 10 is probably adequate for relatively shallow targets. (Penetration increases as frequency decreases.) Different elements with lower frequencies can be constructed. This is simplest when three-phase power is available. An example 40 is given in FIG. 2A. Waveform element 40 is squared and shown at 50 in FIG. 2B. FIG. 2C shows the autocorrelation of squared wave 50 at 60, after removal of low frequencies.

Figure 2A:
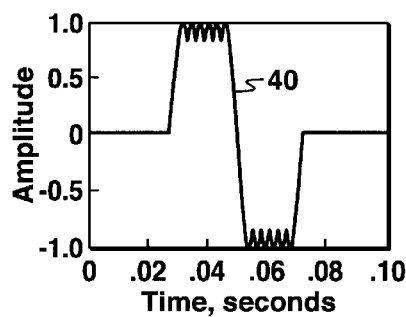
FIG. 2A shows a waveform element of frequency less than 60 Hz, constructed from three-phase 60 Hz waves.
Figure 2C:
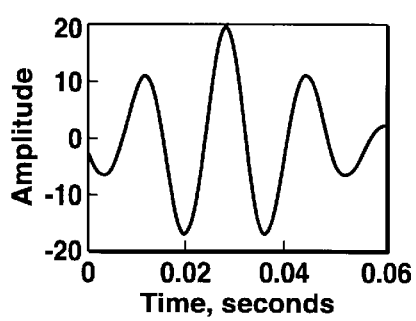
FIG. 2C shows the autocorrelation of the squared waveform element of FIG. 2B, after removing low-frequency contributions.

By way of further explanation of FIG. 2A, three-phase power (plus the three polarity-reversed signals) provides six sinusoids with 60 degrees of phase shift between them. A variety of approximately square-wave signals can be constructed by switching from one sinusoid to the next at the crossover point. As one signal starts to fall off from its peak, the output is switched to the next signal which is rising to its peak. In this manner, an approximate square wave can be constructed. The square wave can be made with a desired width that has an integer number of such cycle switches, and hence with a corresponding frequency less than 60 Hz. FIG. 2A illustrates an example where the peak is prolonged by switching five times to the next-in-phase sinusoid to yield a square wave 40 with frequency of about 20 Hz.

The construction of the waveform element is an important aspect of the design of the electroseismic source. Methods such as genetic algorithms can be used to determine a desirable element for a given target with specified seismic attenuation and electromagnetic skin depth. In general, the deeper the target, the lower the preferred frequency because higher frequencies tend to be absorbed, reducing efficiency. A frequency of 60 Hz gives good results for targets between approximately 100 and 1000 feet in depth, for typical sediments. Furthermore, the 60 Hz wave element, although not preferred, may be used successfully to much greater depths, on the order of 5,000 feet. The practical and convenience advantages of constructing the waveform from 60 Hz line power is obvious. Furthermore, such hardware implementation is easiest for a single frequency sinusoid wave element, in part because efficiency does not have to be sacrificed for broadband amplification.

The invention will, of course, work at frequencies above the common line frequencies. Although higher frequencies are more attenuated by the earth, they give better depth and spatial resolution. A frequency higher than line frequency may give higher resolution at useful depths and be preferable for that reason. For example, 400 Hz is a frequency used in ships and airplanes, and generators operating at this frequency are readily available. In some applications, a frequency of 400 Hz or higher may give good results or even be preferable to line frequency for the above-stated reasons.

Correlation side lobes are of critical importance in electroseismic exploration because there can be a very large peak essentially at (actually just past) time zero. This large peak comes from unavoidable direct pickup at the receivers from fields related to the input currents. The large peaks will typically have significant correlation side lobes. Even though these direct-pickup side lobes are reduced from the peak amplitude, they may still be large enough to mask the much smaller desired electroseismic returns. The level of the direct pickup can be moderated by proper field design and/or by other innovations such as receiver modifications; nonetheless, it is best to minimize the impact of the direct pickup by using a source waveform with minimal correlation side lobes. (Correlating with the appropriate reference waveform for the source waveform will reduce all side lobes, including the direct pickup side lobes because the direct pickup also is caused by the applied signal.) Furthermore, the methods of the present invention for reducing interference from linear electroseismic response, to be explained below, also play a major role in dealing with the side lobe problem because direct pickup is linearly related to the applied signal.

The nonlinear electroseismic response will be proportional to the square of the input electric signal, as explained above. In the case of a sinusoid wave element, this seismic response will be in the form of a sinusoid of double the frequency. Since the reference waveforms should resemble the waveform of the expected seismic return, the most obvious choice of a reference wave for processing this nonlinear seismic return is the input signal squared, with the low frequency (DC or near DC) components filtered out for the reasons stated above. Circuitry to construct such a wave is well known. In actual practice of the invention, a band-pass filter is used providing filtering above and below a measured electroseismic response. The physical explanation for the need for filtering out higher frequencies as well as lower frequencies is (1) skin-depth losses of the electroseismic field going down and (2) seismic losses (earth attenuation of higher frequencies) on the return path.

A modified version of a binary sequence known as a maximal length shift-register sequence is the preferred binary coding to use to detect nonlinear electroseismic conversion.

A shift register of degree n is a device consisting of n consecutive binary (1, +1 or 1, 0) storage positions or "registers", which shifts the contents of each register to the next register down the line, in time to the regular beat of a clock or other timing device. In order to prevent the shift register from emptying by the end of n clock pulses, a "feedback term" may be compiled as a logical (i.e., Boolean) function of the contents of the n positions and fed back into the first position of the shift register.

For example, consider the case where n=4 and the feedback function is to add the contents of the third and fourth registers, the sum to become what is put into register 1 after the next shift empties it. Such addition of binary numbers is called modulo 2 addition and is denoted by the symbol $\oplus$.

Figure 13:
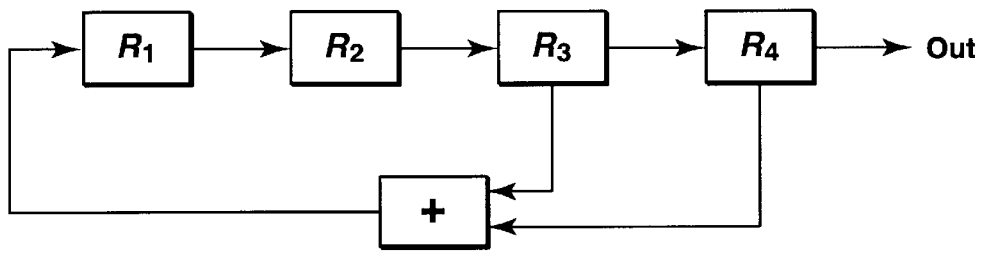
FIG. 13 illustrates a shift register of degree 4 with feedback logic as indicated.

Thus in the binary $\{1,0\}$ domain, $0\oplus 0=0; 0\oplus 1=1; 1\oplus 0=1;$ and $1\oplus 1=0$. Such a shift register is illustrated in FIG. 13.

It can be shown that this feedback function can be expressed as the following recursion formula:

$$X_i = X_{i-3} \oplus X_{i-4}$$

where $X_i$ is the contents of any one of the four registers for the i-th shift. Thus, the contents of any register are the modulo 2 sum of what was in that same register 3 shifts previously and what was in that same register 4 shifts previously.

Starting the process with the contents of all four registers set to 1, i.e., $X_0(R_1)=X_0(R_2)=X_0(R_3)=X_0(R_4)=1$, the four registers take on the following values before the numbers begin repeating:

| i | $X_i(R_1)$ | $X_i(R_2)$ | $X_i(R_3)$ | $X_i(R_4)$ |
|---|---|---|---|---|
| 0 | 1 | 1 | 1 | 1 |
| 1 | 0 | 1 | 1 | 1 |
| 2 | 0 | 0 | 1 | 1 |
| 3 | 0 | 0 | 0 | 1 |
| 4 | 1 | 0 | 0 | 0 |
| 5 | 0 | 1 | 0 | 0 |
| 6 | 0 | 0 | 1 | 0 |
| 7 | 1 | 0 | 0 | 1 |
| 8 | 1 | 1 | 0 | 0 |
| 9 | 0 | 1 | 1 | 0 |
| 10 | 1 | 0 | 1 | 1 |
| 11 | 0 | 1 | 0 | 1 |
| 12 | 1 | 0 | 1 | 0 |
| 13 | 1 | 1 | 0 | 1 |
| 14 | 1 | 1 | 1 | 0 |

The numbers generated in register 1 (the other registers generate the same sequence with cyclic permutation) are the "shift-register sequence" for this particular shift register of length 4 and particular recursion relationship. It can be seen that the number 1 in any cycle is the modulo 2 sum of the numbers in register 3 and 4 in the previous cycle which, in turn, are the same two numbers that were in register 1 three and four shifts previously, as required by the recursion formula.

The output of any shift register is ultimately periodic, with a period not exceeding $2^n$ where n is the degree, or length, of the shift register. (See the book *Digital Communications With Space Applications* by Solomon W. Golomb, Prentice Hall, Inc. (1964) 9). For linear recursion formulas, defined by Golomb at page 9, the period is at most $2^n-1$. In the example above, where n=4, the maximum period is 15 and therefore the sequence generated above has the maximum possible length, and accordingly is called a maximal length shift-register sequence.

Figure 3A:
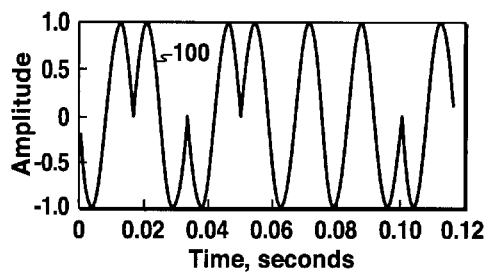
FIG. 3A shows a waveform segment constructed by coding a 60 Hz sinusoid wave element with a maximal length shift-register sequence of length 7.
Figure 3B:
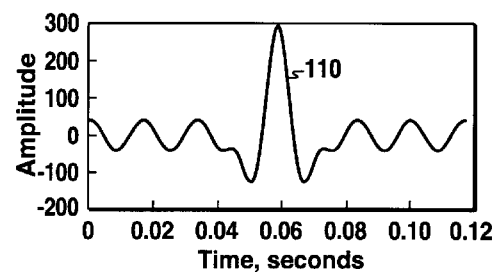
FIG. 3B shows the autocorrelation of this waveform segment.

An example of a maximal length shift-register sequence of length 7 (which uses a $\{1, -1\}$ binary coding) is $\{-1\ 1-1\ 1\ 1\ 1-1\}$. FIG. 3A shows the resulting extended waveform segment 100 using a 60 Hz element. The circular autocorrelation 110 of waveform 100 is shown in FIG. 3B. The central portion of waveform 110 is the autocorrelation of a single 60 Hz cycle and the side lobes are 60 Hz with relative amplitude of $\frac{1}{7}$ (for a length 7 sequence). This degree of side lobe reduction might be acceptable for long sequences in the linear conversion case, but $\{1,-1\}$ binary sequences will not be useful for the nonlinear electroseismic case since the squaring mechanism will remove all information coded in the $\{1,-1\}$ polarity reversals. This is why preferred waveforms for linear electroseismic are insensitive to the nonlinear response. However, maximal length shift-register sequences are the starting point for digital codes that will work in the nonlinear case.

Figure 4A:
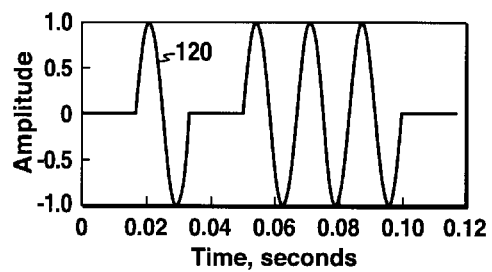
FIG. 4A shows the waveform segment of FIG. 3A, with negative polarity cycles zeroed.
Figure 4B:
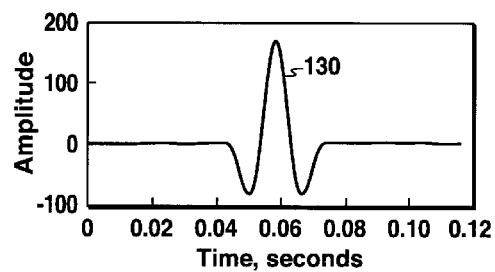
FIG. 4B shows the cross correlation of the wave segment of FIG. 4A with that of FIG. 3A.
Figure 5A:
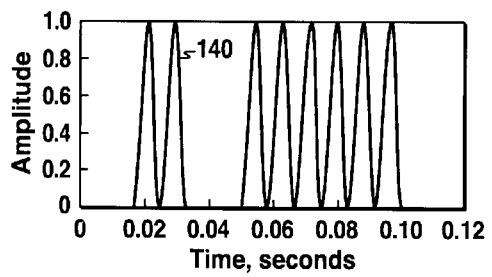
FIG. 5A shows the square of the wave segment of FIG. 4A.
Figure 5B:
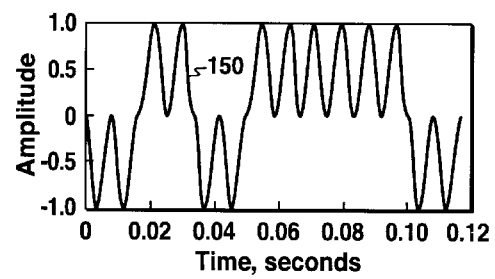
FIG. 5B shows the preferred reference waveform for correlating the waveform in FIG. 5A. The nonlinear signal resulting from cross correlation of the waveform in FIG. 5A and the reference of FIG. 5B is shown in FIG. 6A (low frequencies removed).

Foster and Sloan, for example, altered waveform 100 to include only the positive binary elements 120, with the negative elements replaced by zero-amplitude elements, as shown in FIG. 4A. (Foster, M. R., and Sloan, R. W., "The Use of Pseudonoise Sequences to Code a Pulsed Neutron Logging Source", *Geophysics* (1972) Vol. 37, 481–487). Such a $\{1,0\}$ binary coded waveform will not lose all coded information upon squaring. Moreover, when circularly correlated using waveform 100 (FIG. 3A) as the reference, the result 130 now has zero side lobes (FIG. 4B). A disadvantage of this approach is that the peak value is roughly halved because of the zero-amplitude elements.

To explain terms used above, autocorrelation means the correlation of a signal with itself. Cross-correlation means correlation of a waveform with a different waveform, e.g., a reference waveform. When the type of correlation is clear from the context, the prefix auto or cross can be omitted. Circular correlation can be explained as follows: In a standard correlation process, the signals are assumed to be "zero-padded" prior to correlation, i.e., the signal wave sequence and its reference are assumed to drop to zero amplitude before and after the sequence. The correlation process involves the cross product of one signal and a shifted version of the second signal for various shifts. With the zero padding, the portion of the shifted signal that passes the end of the stationary signal has no effect because it is multiplied by the appended zeros. In the case of circular correlation, the signals are assumed to repeat rather than have zero padding. Thus, as the shifted signal passes the end of the stationary signal in the correlation process, it begins to overlap the beginning of the stationary signal. Circular correlation is preferred for the preferred waveforms of the present invention because it reduces the side lobes better than standard correlation. Circular correlation can either be autocorrelation or cross-correlation.

The $\{1,0\}$ coding of a shift-register sequence modified as in FIG. 4A provides a good starting point for the nonlinear detection problem. Using this extended waveform segment 120 as the input electrical signal, the nonlinear electroseismic return might be expected to look like the square of waveform segment 120, which is waveform segment 140 illustrated in FIG. 5A (still a $\{1,0\}$ sequence). Such an all-positive waveform segment will not provide the preferred amount of side lobe cancellation in the correlation process. Accordingly, in the present invention, to generate one possible preferred reference waveform to use in conjunction with source waveform 120, the original {1-1,} sequenced waveform 100 (FIG. 3A) is squared, and then the {1,-1 } sequence, i.e., {-1 1 -1 1 1 1 -1} is reapplied to generate some negative cycles, with the result being waveform segment 150 in FIG. 5B. The cross-correlation of the squared (nonlinear) response 140 with the reference waveform 150 is shown at 160 in FIG. 6A after the low-frequency components are removed.

Figure 6A:
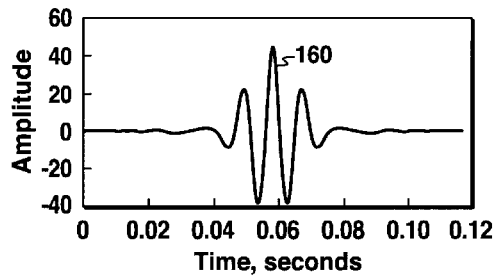
FIG. 6B shows the undesired cross-term resulting from correlating the linear signal of FIG. 4A with the nonlinear reference of FIG. 5B.
Figure 6B:
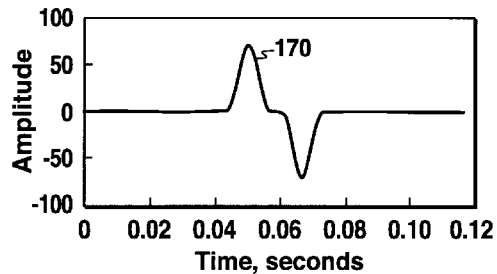

FIG. 6A shows that the need for side lobe reduction has been met. However, the combination of source waveform 120 and reference waveform 150 will not solve the concern of interference between the correlation of the inevitable linear response and the correlation 160 of the desired nonlinear response. This can be seen in FIG. 6B which shows, at 170, the correlation of source waveform 120 with reference waveform 150. Since the linear seismic sequence will be proportional to the source waveform, wavelet 170 also represents the correlation of the linear seismic response and it can be seen that this unwanted "cross-term" coincides on the time scale with the desired correlation of the nonlinear response 160, both occurring at approximately 0.06 seconds. The correlation wavelets 160 and 170 would actually occur at Time=0 in this theoretical simulation of a seismic response. The 0.06 second delay was introduced for display purposes.

The present invention includes methods for minimizing this interference, or "linear-nonlinear correlation" noise. This is done by further modifying the source signal 120 so that the cross-correlation noise is delayed in time so that it no longer coincides with the desired nonlinear correlation.

Figure 7A:
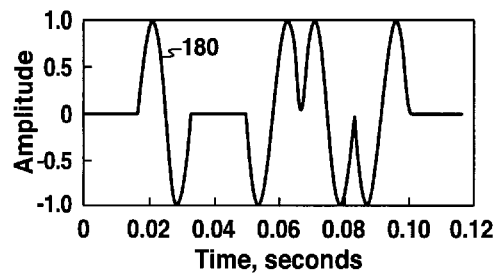
FIG. 7A shows the source wave segment of FIG. 4A with the polarity of certain cycles reversed.
Figure 7B:
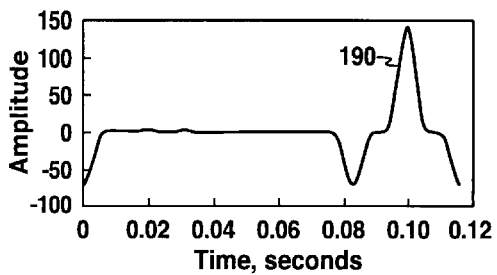
FIG. 7B shows the correlation of the linear signal represented by this modified source wave segment with the nonlinear reference of FIG. 5B.

To accomplish this, certain cycles in source signal 120 (FIG. 4A) are reversed (in polarity), thus converting the {1,0} binary coding of wave segment 120 to, for example, the {1, -1, 0} digital coding of wave segment 180 shown in FIG. 7A. More specifically, the {0 1 0 1 1 1 0} sequence of wave segment 120 has been converted to the {0 1 0 -1 1 -1 0} sequence of wave segment 180. The squared response, i.e., the expected nonlinear seismic return, remains the {1,0} coded wave segment 140 in FIG. 5A. Thus, the same correlation reference (150 in FIG. 5B) is used, resulting in the same correlated nonlinear response 160 in FIG. 6A. The difference is that the unwanted linear-nonlinear correlation is shifted in time. This will be the correlation between wave segment 180, representing the linear seismic response, and reference 150. This correlation is shown as wavelet 190 in FIG. 7B. As can be seen in comparing the time axes of FIGS. 6A and 7B, the delay of the unwanted cross-term in FIG. 7B is sufficient to substantially eliminate overlap with the desired correlation 160 in FIG. 6A.

The selection of which cycles to reverse to generate a desired {1, -1, 0} coding sequence for the source waveform is important. A preferred approach is to multiply (term-by-term) the input {1,0} sequence, which is {0 1 0 1 1 1 0} in the preceding example, by any circularly rotated version of the {1, -1} maximal length shift-register sequence that served as the starting point, in this example: {-1 1-1 1 1 1}. The rotated {1, -1} sequence is uncorrelated with the input sequence except at the rotated lag. The reason for this lack of correlation arises from the theory of pseudo-random sequences, and is, in fact, the same reason that accounts for the lack of side lobes in cross-correlation 130 (FIG. 4B). In the example given above, the starting sequence {-1 1-1 1 1 1-1} is rotated three positions to the right, yielding {1 1 -1-1 1-1 1}. This sequence, when multiplied by the input sequence {0 1 0 1 1 1 0}, yields the {0 1 0 -1 1 -1 0} sequence of wave segment 180, the modified source signal. Other circular rotations of the starting {1,-1 } sequence will also work.

Figure 8A:
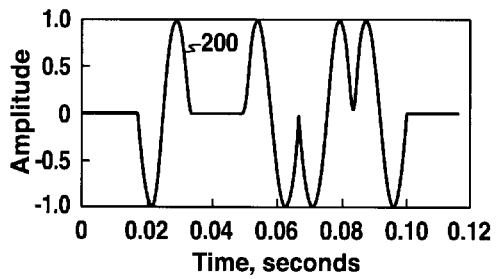
FIG. 8A shows the input sweep of FIG. 7A with all polarities reversed.
Figure 8B:
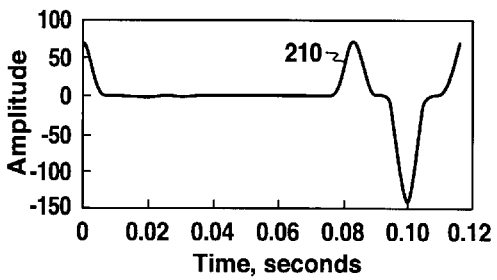
FIG. 8B shows the correlation of this polarity-reversed linear signal with the nonlinear reference of FIG. 5B.

The present invention provides a second stage for further reduction of the linear-nonlinear correlation cross-term, if further reduction is deemed desirable. In this second stage, after a source signal such as 180 in FIG. 7A has been used, the electroseismic experiment is repeated using a polarity-reversed input sweep. Polarity reversal of sweep 180 yields the {0 -0 1 -1 1 0} sequence illustrated as sweep 200 (FIG. 8A). Since polarity reversal will not affect the squared response or the reference waveform, the desired nonlinear correlation is unchanged (160 in FIG. 6A). However, the linear-nonlinear correlation 210 (FIG. 8B) is polarity-reversed compared to the correlation cross term 190 resulting from sweep 180 (FIG. 7B). Adding the results of the two experiments doubles the desired signal 160 (FIG. 6A) while completely removing the undesired linear-nonlinear cross-term. In a less-preferred embodiment of the present invention, this second stage is used without the first stage, i.e., without the {1, -1, 0} coding and the resulting delay of the cross-term. This embodiment is less preferred because the cross-term cancellation of the second stage is theoretical, and may not be perfect in practice in which case cross-term remnants may interfere with desired signals.

Short sequences such as the preceding example of length 7 are primarily for illustration of the present invention. In actual field use, much longer sequences are preferable. A typical approach might be to use several repeated 255-cycle sequences, each sequence lasting 4.25 seconds with a 60 Hz wave element. With a sequence of this length, the linear-nonlinear correlation is delayed approximately 2 seconds, pushing it well out of the time range of interest. It should be noted that regardless of the length of the signal (input sweep) sequence, cross correlation of the seismic return (linear or nonlinear) with the appropriate reference waveform produces a time-localized central wavelet much like that of FIG. 4B or FIG. 6A. Similarly, the direct pickup from the signal source, after correlation with the reference wave, will produce a similar, localized wavelet, assuming that side lobes are adequately attenuated. The side lobe attenuation is accomplished in the present invention in two ways, as stated previously: (1) side lobe amplitudes are reduced in direct proportion to the length of the sweep sequence, for pseudo-random binary sequences such as the maximal length shift-register sequences used in preferred embodiments of the present invention; and (2) the correlation with the reference waveform further reduces side lobes.

The correlation wavelet from direct pickup is time-shifted in embodiments of the present invention that employ the {1, -1, 0} sequence to time-shift the unwanted linear-nonlinear cross-term. This is because the direct pickup, being the signal itself, will be a linear term correlated with a nonlinear reference, and will therefore be delayed in time just as the linear seismic response is. Thus, the direct pickup wavelet is not a problem in the present invention, which is a significant advantage of the nonlinear electroseismic method compared to the linear electroseismic method.

Figure 1C:
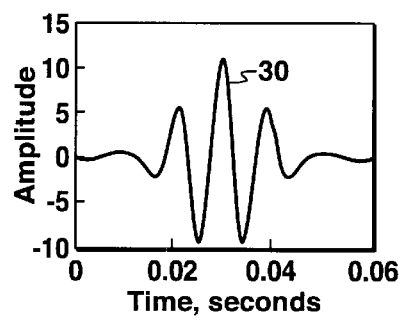
FIG. 1C shows the autocorrelation of the squared waveform element of FIG. 1B, after removing low-frequency contributions.

FIG. 6A illustrates the fact that for digitally-coded waveforms such as are discussed above, the central pulse after correlation is always determined by the correlation of a single wave element, the square of a 60 Hz sinusoid in this case. Thus, FIG. 1C represents the autocorrelation of not only the single cycle in FIG. 1A, but also that same cycle repeated. Further, the similarity between FIGS. 1C and 6A is not coincidental. The near side lobes in these two figures are a function of the bandwidth and shape of the spectrum. These near side lobes are not attenuated by binary sequence cancellation in the correlation process or by the length of the sequence as are the far side lobes such as are shown in FIG. 3B. The far side lobes result from the fact that the source is an extended wave segment of many cycles and not a single pulse. Some binary sequences do not produce total cancellation of the far side lobes. Even where the present inventive method yields theoretical total cancellation, the cancellation will not be perfect in practice due to slight errors in line frequency or amplitude stability. The primary information desired from an electroseismic experiment is the time and amplitude of the central correlation peak, plus resolution sufficient to discern closely spaced reflectors. Thus, side lobes of both types are undesirable. Deconvolution processing can sometimes reduce near side lobes. When used in the appended claims, the term "side lobe" refers to the far side lobes.

The choice of a binary sequence and waveform element will depend on the target, the geology, and the field configuration. The decision on a waveform element would be based largely on the target depth and the expected attenuation. The decision on the binary sequence, as discussed above, would be based on the relative level of direct electromagnetic pickup and, consequently, the need for side lobe reduction. Appropriate selections will likely require computer modeling and field tests. Although the present invention is primarily for use on land, it can give useful results in a marine environment.

Maximal length shift-register sequences need circular correlation to best reduce side lobes, which tends to place a practical limit on the length of such sequences. If circular correlation is to be used, the sequence needs to be repeated (in the field) at least once to provide circular overlap. The first cycle can be used only to provide delayed correlation effects on the next cycle, and hence is lost for data-gathering purposes. While a longer sequence is preferred for side lobe reduction, a shorter sequence is preferred to avoid data loss and waste of field time. The preferred compromise is to use an intermediate length sequence and repeat it several times, perhaps three to seven cycles in all. Thus a maximal-length shift register sequence of length 255 might be selected and repeated six times for a total of seven cycles. This would consume about 28 seconds in the field assuming a 60 Hz wave element, and only ⅐ of the data would be, in effect, lost.

Figure 14:
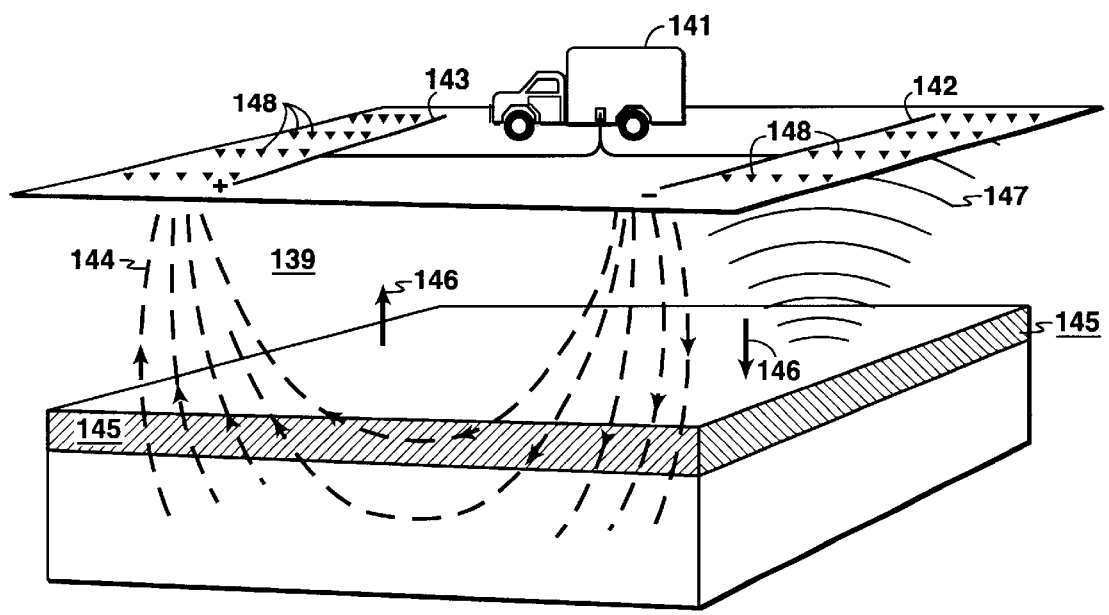
FIG. 14 illustrates a typical field setup for the present invention.

FIG. 14 is a diagram of a possible field layout for deployment of the present invention. Electric current is injected into the subsurface 139 by applying a voltage from a power source 141 between two buried electrode wires 142 and 143. The electrode wires are typically bare 4/0 copper cable. Other sizes of cable may be used as needed to conduct the needed current. The electrode wires should be buried just deep enough to make good electrical contact with the soil. Typically, this depth will be in the range from 1 inch to 10 feet, but in some cases, such as particularly dry surface soil, even deeper burial may be desirable.

FIG. 14 shows the current paths 144. The direction shown is that of the flow of electrons, from the negative electrode to the positive electrode. The power source 141 provides the current and consists primarily of a waveform generator capable of generating the binary-coded waveform segments preferred by the present invention. The power source must also be capable of delivering the source waveform at high current levels because the impedance of the ground is low. The power source preferably operates at high electrical efficiency so that minimum power is consumed. Minimizing power consumption reduces both the cost of operation and generation of waste heat. Such a power source can be assembled by persons skilled in hardware design using commercially available components.

Figure 15:
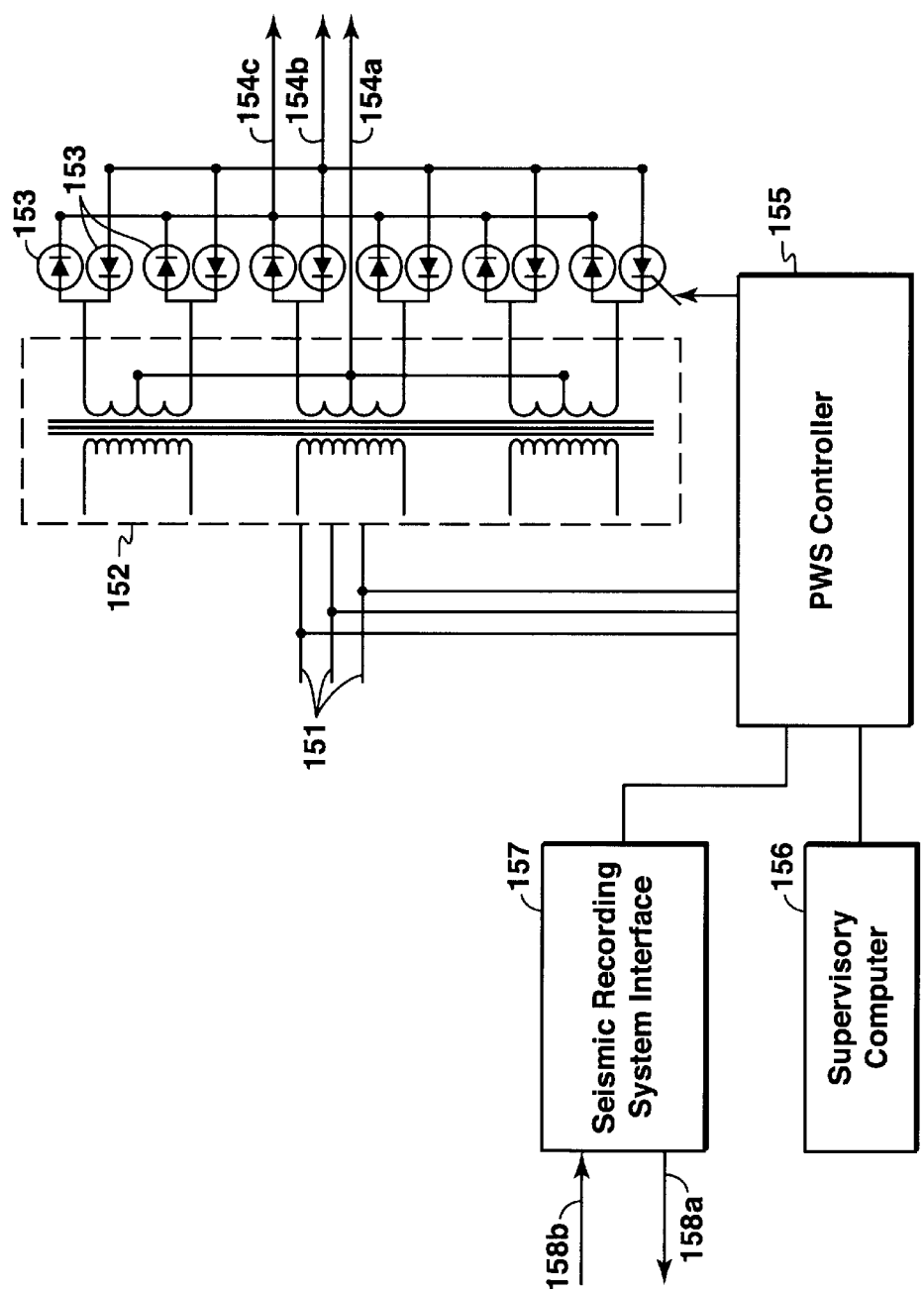
FIG. 15 is a circuit schematic for a Power Waveform Synthesizer.

FIG. 15 shows a block diagram of a preferred power source that produces a binary-coded waveform with the required properties. This type of power source is called a Power Waveform Synthesizer or PWS. Leads 151 go to the local electrical utility power lines (not shown) or to one or more generators (not shown).

The electrical power 151 is fed to step-down transformer 152. The primary side of the transformer typically operates at 480 volts and the secondary at 120 volts. Transformer 152 is similar to those commonly used to distribute power at 120 volts in applications when the power entering a facility is three-phase, 480 volts. It will typically have a power rating of 10 kWatts to 10 MWatts. Other transformers may be preferred when the power source 151 is at voltages other than 480 volts and frequencies other than 60 Hz. The primary voltage will typically be between 400 volts and 100,000 volts. The secondary voltage may be chosen to maximize the current delivered to the ground taking into consideration the kilowatt limitations of the power source and the impedance of the earth. The secondary voltage is typically between 100 volts and 5,000 volts. The frequency will typically be 50 Hz, 60 Hz, or 400 Hz, but may be the frequency of the available power.

The secondary windings of transformer 152 are connected to electronic switches 153. The electronic switches 153 are switched to select segments of the three-phase, 120 volt, 60 Hz. power to create the binary-coded waveform. The switch-selected portions of the waveform voltages are applied between the common output 154a and the negative output 154b or the positive output 154c. Output wires from outputs 154a, b and are connected to the field electrodes 142 and 143 (see FIG. 14). The electronic switches 153 may be any switches known in the art that will carry the current levels needed. For current levels greater than 100 amperes, the preferred switch is a silicon controlled rectifier. The silicon controlled rectifier should preferably be phase controlled and in preferred embodiments of the present invention will have an on-state current rating of 500–5,000 amperes (or more) and a reverse recovery rating of 250 micro seconds (or less).

Each output wire 154b and 154c is preferably connected to separate electrodes to minimize the effects of inductance. The electrical inductance associated with the large current loop formed by currents 144 (FIG. 14) produces large inductive reactance. This large reactance creates currents that flow in the opposite direction to the currents produced by the Power Waveform Synthesizer. Connecting the positive output wire 154c to one electrode and the negative output 154b to another electrode can minimize reverse currents created by the inductive reactance. In this embodiment, the common output 154a will be connected to electrode 143 in FIG. 14. The positive output 154c is connected to electrode 142. The negative electrode 154b is connected to a third electrode located near to electrode 142 but not shown in FIG. 14. This near electrode is spaced a distance from 142 that is small compared to the distance between 142 and 143. If only two electrodes are used (as shown in FIG. 14), the common PWS output 154a is connected to one of the electrodes, and both the positive and negative PWS outputs 154b and 154c are connected to the other electrode. (The positive and negative outputs 154b and 154c are never both switched on at the same time.) In embodiments where separate positive and negative electrodes are used, it is preferred to switch such connections from one sweep to the next to prevent long-term electrochemical reactions at an electrode that is always positive or always negative.

The power waveform synthesizer controller 155 controls the electronic switches 153. Controller 155 is a computer that sends signal voltages to the electronic switches 153. Signal voltages cause the switches 153 to either open to permit current to flow or close to shut off the current. Controller 155 monitors the input voltage 151 so that switches 153 are activated at times that will select the desired phase and voltage levels to produce the desired waveforms that are illustrated in FIGS. 1 through 8. The controller is essentially a dedicated computer that may be designed and built around a digital signal processor, a commercially available product, by a person of ordinary skill in the art, to make switching decisions in times on the order of 100 microseconds and to perform the other functions specified herein.

The supervisory computer 156 programs controller 155 to define the desired waveform. The supervisory computer 156 also monitors the status of the switches 153 and all operating conditions to maintain reliable and safe conditions.

Although they could be combined in a single housing or case, the supervisory computer and the PWS controller are shown as separate in FIG. 15.

The seismic recording system interface 157 sends timing signals 158*a* and 158*b* to and from the seismic data acquisition system (not shown). These timing signals enable the seismic data acquisition system to record signals synchronously with the switching of the switches 153. Interface 157 enables the seismic data recording to start at the same time as the start of the waveform generated in the controller 155. The system interface 157 also sends a reference signal to the seismic data acquisition system. The reference signal is typically the time-dependent voltage or current produced at outputs 154*a*, 154*b* and 154*c*. The reference signal is used to identify those portions of the recorded seismic information that have the same time dependence as the current or voltage at outputs 154*a*, 154*b*, and 154*c*.

The current paths 144 shown in FIG. 14 represent those current paths that penetrate down to the depth of the target 145, typically a petroleum reservoir. Such current trajectories will be nearly vertical below the electrode. Experience shows that the maximum vertical current 146 will typically be directly under or even slightly to the outside of the electrode wires. Accordingly, the maximum amplitude of the resulting surface-directed seismic wave 147 (similar wave below positive electrode not shown) will occur along the line of maximum vertical current, and this determines the preferred location of the seismic detectors 148.

The seismic detectors may be placed anywhere on or below the surface. Location outside the electrode wires is preferred rather than between the electrode wires. The seismic detectors may be geophones, hydrophones, accelerometers or any similar device. Such seismic equipment is well known to those skilled in the art. Preferably, the seismic detectors are buried beneath the surface to reduce seismic noise.

Typically, the configuration shown in FIG. 14 is designed to cover the entire area of interest i.e., source and receivers will not need to be repeatedly moved to progressively cover the area of interest as with conventional seismic. This is one advantage of the electroseismic method, although a single setup is not essential to using the present invention. (The electrode wires and receivers may be dug up when the experiment is over and moved to other locations.) Accordingly, the length of the electrodes may vary between one-tenth of the reservoir (target) depth to several times the reservoir depth. The separation between electrodes in preferred embodiments of the present invention will be approximately equal to the target depth. In some embodiments, instead of horizontal wires, the electrodes are vertical metal stakes.

In electroseismic surveying, the electromagnetic source wave reaches all of the target at essentially the same instant of time. One is therefore usually interested only in the upward-traveling seismic waves that arrive at all of the geophones at approximately the same time, assuming the geophones are deployed as in FIG. 14. Thus, in processing, the ordinary seismic noise can be filtered out because it exhibits what in the seismic art is called "moveout". The source-to-receiver distance, called "offset", is small in electroseismic prospecting. In a conventional seismic survey, a much larger surface area would have to be covered because the longer offsets would be needed from every shot point to provide sufficient signal-to-noise ratio in common mid-point gathers. The area reduction in electroseismic vs. conventional seismic may be approximately fourfold.

The powerful electromagnetic source waves used in the present inventive method can induce electric current flow in nearby metal objects such as fences and pipelines. These induced currents can become bothersome noise sources. For that reason, electrodes should not be located near pipes. Noise due to fences can be reduced by cutting them at intervals so that current paths are kept short.

Figure 9:
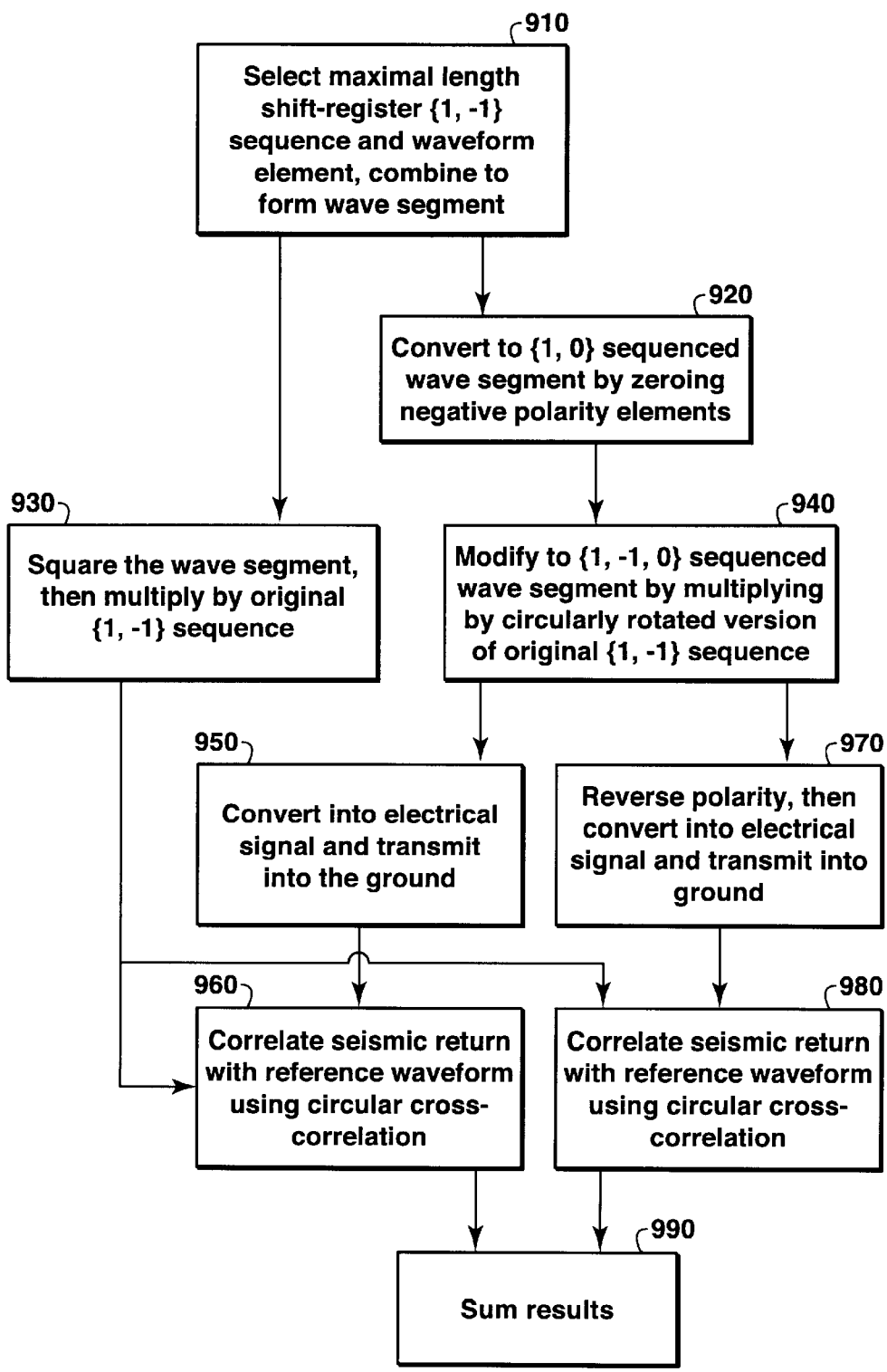
FIG. 9 is a flow chart illustrating certain embodiments of the present invention.

Preferred embodiments of the present invention can be summarized by reference to the flowchart in FIG. 9. Throughout, it is assumed that a waveform is created from a coding sequence using a waveform element selected for its frequency to give desired depth penetration. In step 910, the user selects a waveform element and a maximal length shift-register {1, −1} sequence and combines them to form an extended wave segment. The desire for longer sequences to reduce side lobe amplitudes must be balanced against the capabilities of the recording equipment and the fact that with circular correlation the first cycle of data is lost for data gathering purposes. The result of the preceding competing factors is that it is preferable to select a fairly long sequence and repeat it several times in the field. Although for a shift register of degree n there are many different sequences of maximal length, i.e., of length $2^n-1$, it does not matter which is chosen because all such sequences of the same length will give the same side lobe reduction.

In step 920, the {1,−1} sequence is converted to a {1,0} sequence by zeroing the negative polarity elements.

In step 930, the reference waveform is created by squaring the {1,−1} coded waveform from step 910, and multiplying by the original {1,−1} coding sequence.

In step 940, the {1,0} binary sequence from step 920 is multiplied by a circularly rotated version of the {1,−1} binary sequence from step 910 to convert it to a {1,−1, 0} digital sequence, which combined with the waveform element makes the source waveform.

In step 950, an electrical signal is generated using the {1, −1, 0} coded waveform from step 940, and this signal is transmitted into the ground as a seismic source. In step 960, the seismic return from step 950 is correlated with the reference waveform from step 930 using circular correlation.

In step 970, the polarity of the {1, −1, 0} coded waveform from step 940 is reversed, and an electrical signal using the resulting waveform is transmitted into the ground. This is done as a separate experiment and not simultaneous with the experiment of step 950. The seismic return from step 970 is correlated in step 980 with the reference from step 930, using circular correlation.

Finally, the correlation results from steps 960 and 980 are summed in step 990.

In some embodiments of the present invention, steps 970, 980 and 990 are omitted, and reliance is placed on the time delay introduced in step 940 to discriminate against interference from the linear-nonlinear cross-term. In other embodiments, step 940 is omitted and reliance is placed on the cancellation of the cross-term at step 990 without the additional benefit of the time delay.

In a test of the present invention, buried electrode wires of length 4000 feet were separated by 4500 feet and approximately 1,000 amps of current were injected using a set of sweeps like those illustrated in FIGS. 7 and 8.

For this test, a set of experiments was performed with waveform elements having frequencies of 5, 8, 11, 15, 18, 22 and 25 Hz. About 600 records were collected at each of these frequencies with record lengths of 30 to 40 seconds each. The results were correlated with reference waveforms as described herein and were then summed. The summed results at each frequency were then summed to improve the bandwidth. Other processing steps were performed that would be familiar in the seismic processing industry. These steps include removing noisy records, bandpass filters, pulse-shaping filters, spatial averaging of surface data, adaptive noise removal, and dip-filtering of downhole data.

Figure 16:
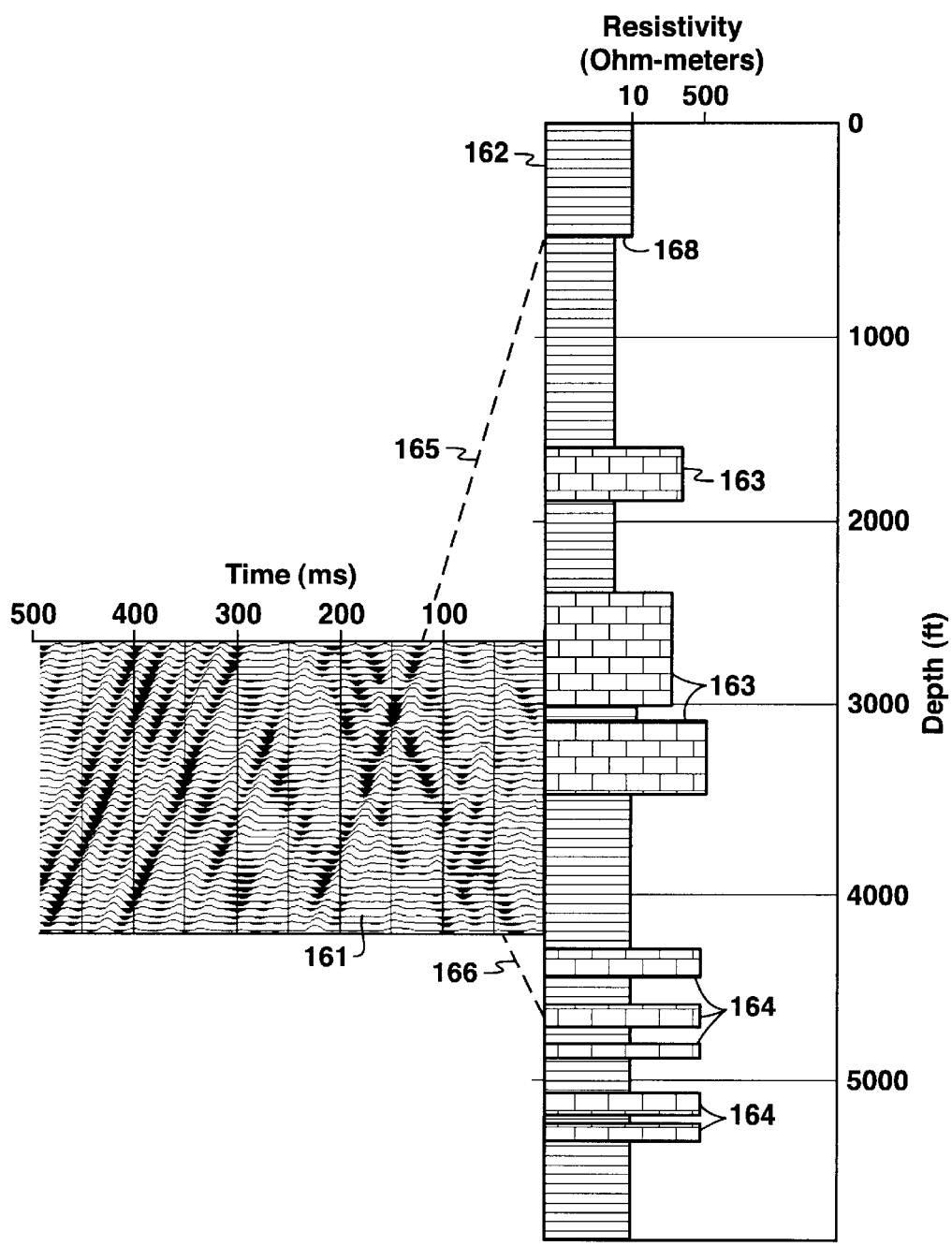
FIGS. 16 and 17 show test results for the present inventive method.

The processed results from a set of downhole vertical geophones are illustrated in FIG. 16. This well was instrumented from depths of 2,630 ft. to 4,250 ft. and the results 161 are displayed to the left of a geologic column 162, at their respective depths. The electroseismic data 161 are plotted with zero time near the column and with time increasing to the left to 500 ms. The geologic column reflects information obtained from well logs.

The linear features in these data represent nonlinear electroseismic events originating at the various resistive limestone beds 163 including the reservoir units 164. The strong linear feature extended by dashed line 165 originates near the surface and can be explained by a near-surface groundwater transition layer 168 from fresh water to salt water. Seismic noise from the surface is present in the data beginning at about 200 ms. All features at less than 200 ms arrive before this surface noise (due to the essentially instantaneous nature of the electroseismic excitation) and thus originate at depth.

What can be observed from the nonlinear electroseismic data in FIG. 16 is that the reservoir zones 164 can be detected from the reflected signals such as the one extended by dashed line 166. The non-reservoir zones 163 also provide nonlinear electroseismic signals, although weaker, because they are also limestone, a porous rock, moist and resistive, conditions which give rise to nonlinear conversion. The resistivity of each zone, from well log data, is shown in the geologic column 162.

Figure 17:
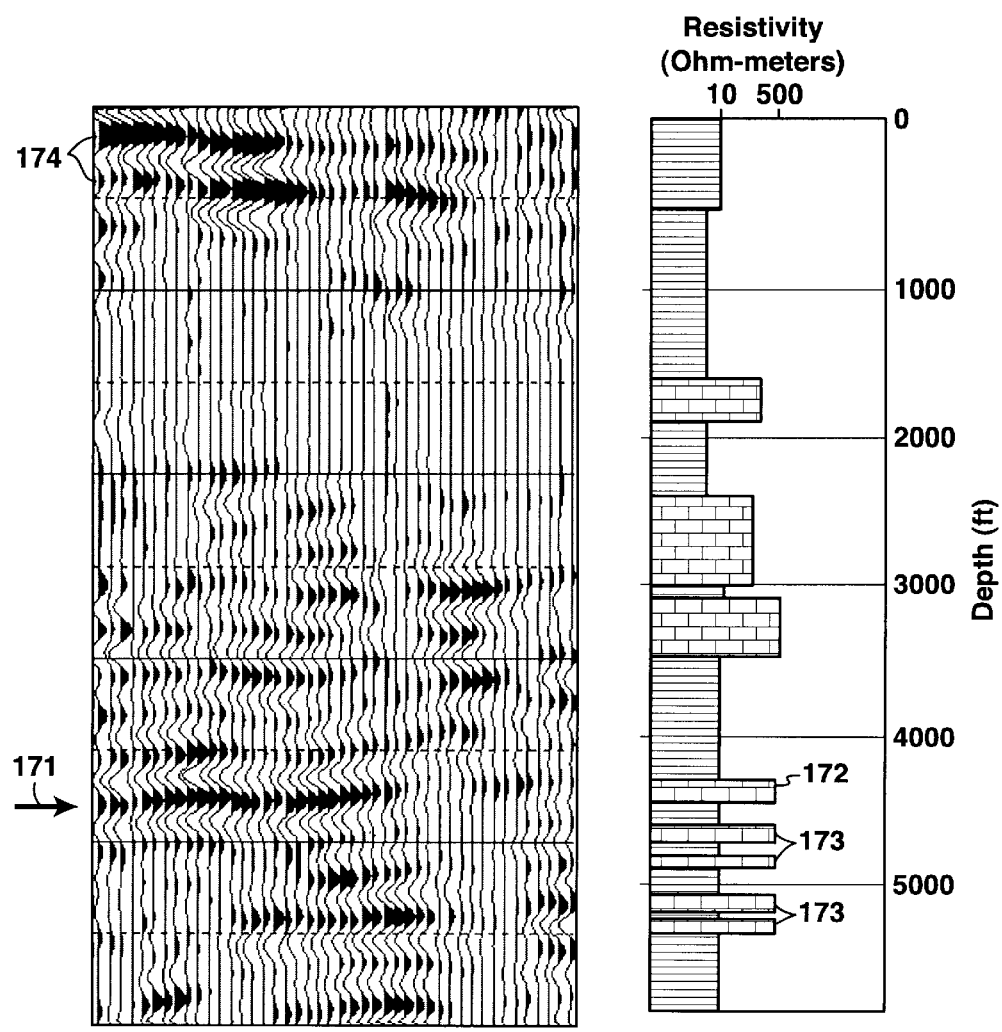

The processed results from a set of digital surface accelerometers are illustrated in FIG. 17. The digital detectors are used because they are not sensitive to pick-up noise from the source-related electromagnetic fields. They are manufactured by Input/Output, Inc. of Stafford, Tex. The detectors in this figure are parallel to and 160 ft outside one of the buried source electrode lines (not shown). A signal of interest 171 in this dataset occurs at the reservoir level at about 4,400 ft. The signal attenuates toward the right as the detectors go off the edge of the reservoir. It matches well with reservoir zone 172. Other prominent signals just below 171 match well with the other reservoir zones 173. As in FIG. 16, the strong near surface signals 174 are attributable to shallow groundwater and to saltwater-freshwater interfaces.

A brief explanation of what is currently believed to be the basis for the present invention follows:

When an electric field is applied to a porous medium, such as a moist rock, the charged dipole layers on the surfaces of rock grains are distorted. The distortion on the dipole layers causes the pore fluid to flow in the direction of the electric field. The induced pressure in the pore fluid couples to the rock matrix to produce a seismic wave. This seismic wave carries information about the pore fluids.

The basis for the present invention is that there are second order effects that can lead to large conversion efficiencies between seismic and electromagnetic energies. These second-order effects will connect the seismic amplitude in an electroseismic process to the square of the electric field and the double of the electric field frequency. There may also be "higher order" responses where the response is some more general nonlinear function of the stimulus.

An electric field, applied to a moist rock mass, displaces ions in pore fluids. The displacement of the ions creates an electric field internal to the rock pore space that is in the opposite direction to the applied field. The net internal electric field is then smaller than the applied field. Those skilled in the art will recognize that a polarization that decreases the internal electric field in a solid sample is equivalent to the description of a dielectric. The ratio of the applied field amplitude to the internal field amplitude is the relative dielectric constant. It is also well know to experts in the field that when an electric field is applied to a dielectric the interaction of the applied and internal electric fields causes constriction of the sample. This is the effect called electrostriction. Electrostriction is an effect that is created by the forces across a macroscopic sample. The forces of constriction require the presence of sample boundaries where the constricting forces occur.

The dielectric constant of moist rock increases at low frequencies. The dielectric constant and the induced polarization at low frequencies have the same physical origin in the polarization of the pore-surface dipole layers. These dipole layers may be viewed as variable capacitors with a high capacitance per unit surface area. In an electric field, the ions involved in surface-charge compensation are moved out of their steady-state configurations. When the field is shut off, the ions diffuse back to the original state. The diffusion times can be quite long and are extended by the geometric complexity of the pores.

Although the dielectric constant is often explained in terms of surface capacitance, it should be noted that the physics is not equivalent to charging a capacitor. The applied electric field displaces charge that itself changes the value of the capacitance. The amount of charge displacement is related to L, the electro-osmotic mobility. The "RC time constant" is not defined because there are many relaxation times in the system corresponding to ions in different pore structures. In numerous dielectrics there is a similar situation where polarized molecules reside in different environments or interact with each other to produce stretched exponential relaxation. But in rocks, the relaxation times are associated with diffusion of easily displaced ions, hence the large dielectric constants that increase at low frequencies.

Figure 10:
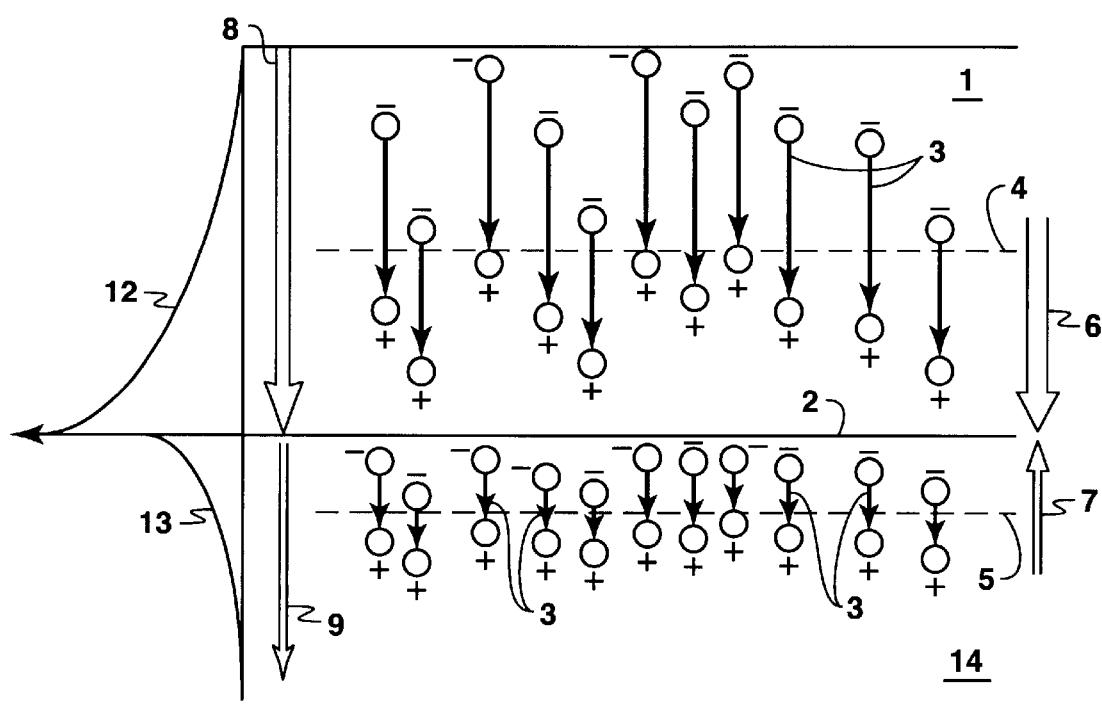
FIG. 10 illustrates the polarization of a water-sand/gas-sand interface when an electric current is applied from above.

FIG. 10 illustrates the polarization at an interface 2 between an upper rock 1, a water sand, and a lower rock 14, a gas sand, when an electric field is applied from above. The model is completed with two electrodes on the Earth's surface, one directly above the location depicted in FIG. 10 and one at a great distance (electrodes not shown). The dielectric constants are assumed to be the same ($10^5$ to $10^7$) in the two rocks but the resistivity in the upper rock (water sand) is much less (~10 Ohm-meter) than in the lower rock (~2000 Ohm-meter). Most of the current (not shown) conducting vertically downward through the top rock will divert along the interface 2 rather than enter the bottom rock, because that is the path of smallest resistance. This causes a discontinuity in the electric field normal to the interface. The positive and negative charges in each rock at the interface see different electric fields and experience different forces because of the different field gradients 4 and 5 within each rock. There is then a net force on the interfacial dipoles 3 as a result of the field gradient. This force produces electrostriction on dielectrics. A more detailed explanation follows.

When an electric field is applied across a dielectric, the molecules will exhibit an electric dipole moment even though the dielectric as a whole is electrically neutral. As shown in FIG. 10, the dipoles 3, although they are bound charges and not free to move great distances like charges in a conductor, will tend to align themselves with the external field 8, looking only at the upper (water sand) rock for the moment. The result of this alignment is that there will be a net positive surface charge distribution at the bottom surface 2 of the upper rock and a negative surface charge on the upper surface (not shown) of the rock (for the field direction 8 as shown). These two surface charge distributions create a field smaller than the applied field and opposite in direction. The net electric field in the dielectric is then less than the applied field. Because the electric field must increase to the value of the applied field just outside the surface 2 of the upper rock, this gradient illustrated by the graph 12, occurs across a thin layer at the surface, approximately between lines 4 and 2. Because of this gradient, the positive charges in the surface dipoles experience a greater force than the negative charges, resulting in a net downward force 6 in this surface layer of the upper rock. This force must be balanced by a pressure increase in the surface layer.

If the applied field drops to zero then increases to some peak value in the opposite (upward) direction, the dipoles realign in the opposite direction. Again a net force acts on the bottom surface layer, and again it is downward in direction. Thus, in the course of one cycle of the applied electric field, two pressure (seismic) pulses are generated. The electroseismic coupling is therefore second order; the frequency of compression is twice that of the electric field frequency. The electroseismic coupling is also second order in the magnitude of the electric field. This is because the electric field first creates a polarization field gradient at the boundaries, then the same electric field interacts with the polarization field to create constriction. It takes two interactions of the electric field to produce a constriction so the constriction depends on the square of the electric field. This is the phenomenon of electrostriction.

The same thing occurs at the surface 2 of the lower rock (gas sand), as shown in FIG. 10. The applied field 9 causes a negative surface charge at 2 which sets up an opposing internal field which results in the net field graphed at 13. The gradient in the field 13 causes a net force 7 on the surface layer, which produces a pressure pulse. Lines 4 and 5 indicate where the electric fields 12 and 13, respectively, have fallen off to approximately 1/e of their peak values at interface 2.

Moist rock is unusual in that it can have both a high dielectric constant and a low resistivity. The discontinuity in the electric field at the interface 2 in FIG. 10 results from the fact that 2 is an interface between dissimilar materials. The main difference is a great difference in resistivity. If the materials 1 and 14 on either side of the interface 2 were identical, there would be no discontinuity in the electric field. If there were no discontinuity in the field, the pressure pulses 6 and 7 would be equal and would cancel each other.

The very large dielectric constants in moist rock dictate that the polarization forces are large. Both sedimentary and igneous rock, when moist, can have dielectric constants greater than 10 at seismic frequencies. See *Handbook of Physical Constants*, The Geologic Society of America, (1966), Table 26–16, Page 571. When the upper rock has a resistivity of 10 ohm-meter and the lower rock a resistivity of 2000 ohm-meter and both have dielectric constants of $10^6$, the net interfacial strain with a field of 1V/m is $10^{-11}$ meters corresponding to a particle velocity of ~$10^{-10}$ m/sec at seismic frequencies, which is within the sensitivity of seismic systems currently in use.

The key points in the preceding explanation of electrostriction are (1) the effect has a second order dependence on the applied electric field, differentiating it from linear electroseismic conversion, and (2) the magnitude of the effect can be quite large and well in the detectable range due to the very large values for the dielectric constant in moist rock, especially at low frequencies.

Electrostriction has been known for years but not developed until now as a basis for geophysical prospecting. The inventors of the present invention postulate that there may be other mechanisms besides electrostriction that contribute to the nonlinear electroseismic response.

Figure 11A:
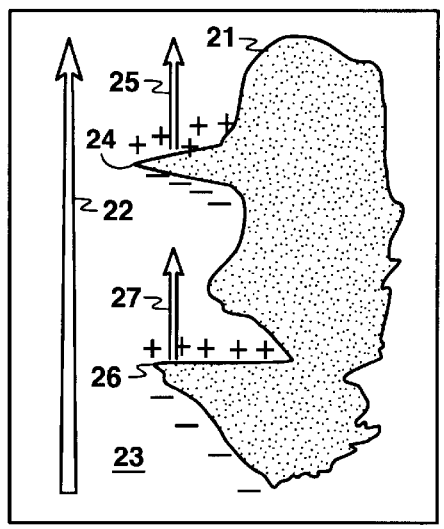
FIGS. 11A, 11B, 12A, and 12B illustrate forces caused by reversing an external electric field on rock grains imbedded in a saline solution.
Figure 11B:
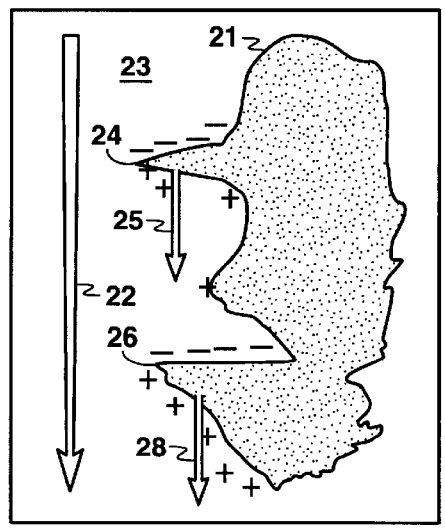

A second example of higher order electroseismic conversion concerns the body forces and compressive forces on the microscopic roughness in pore spaces. FIGS. 11A and 11B illustrate forces imposed on a rock grain 21 by an external electric field 22. The grain is imbedded in a saline solution 23. The surface of the grain has a net negative charge (not shown) that is balanced by positive charges from solution. When an electric field is applied to the rock, the positive charges in solution are displaced in the direction of the field. The sharp point 24 on the grain at the top represents a symmetrical protrusion. When the field is applied in the directions shown, the charge displacement is symmetrical for upward and downward fields. The Coulomb attraction force 25 on the tip is proportional to the applied field 22 and always in the same direction as the field. In this case the applied field creates a first-order responsive force on the grain. The protrusion 26 on the lower part of the grain is not symmetrical. An upward electric field does not create the same force 27 (FIG. 11A) on the grain as the force 28 created by a downward field (FIG. 11B) when the positive and negative mobilities are not equal. If a sine wave electric field is applied to the grain there is a net torque applied to the grain because of the forces around this tip. The force on the grain is not a sinusoidal response to a sine wave electric field.

Figure 12A:
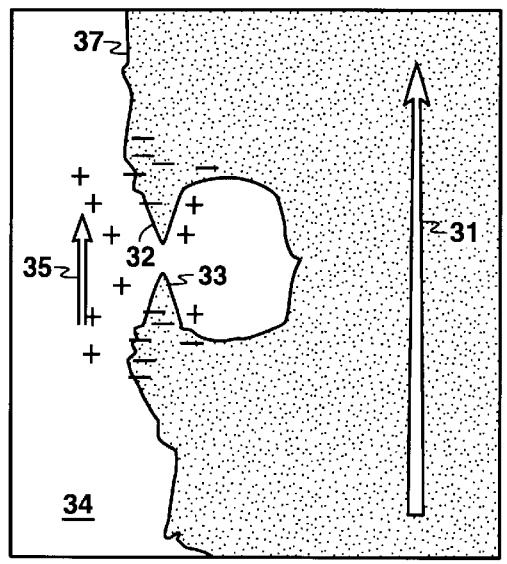
Figure 12B:
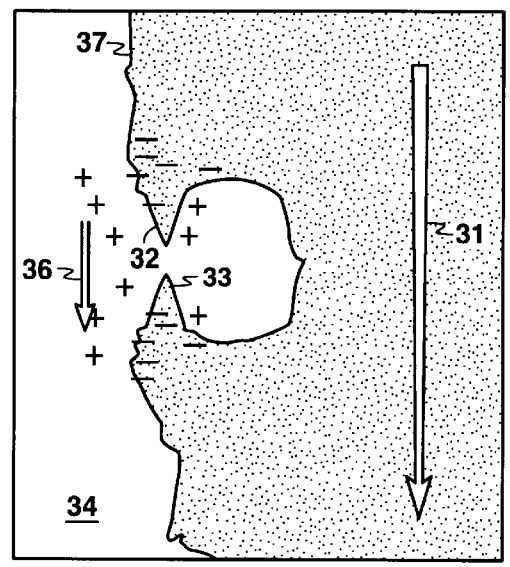

FIG. 12A illustrates an example of local forces on rough grains that produce both first-order and second-order responses. As in FIGS. 11A and 11B, assume the grain tips have negative charge balanced by positive charges located nearby in the solution and therefore much more mobile than the negative charges. When the external field 31 is applied, the positive charges move in response from the vicinity of the lower tip 33 to the vicinity of the upper tip 32. The result is the upper tip has a net positive charge and the lower tip a net negative charge, causing an attractive force between the two tips due to the displaced charge distribution. When the field 31 is reversed in direction in FIG. 12B, the result is still an attractive force between the tips. This attractive force causes the rock to constrict. The attractive force between tips is a second-order response. In addition, where the tips and hence the charge redistribution are not symmetrical, there can be a first-order force 35 on the two tips that is caused by interaction between the induced charge gradient and the external field. In FIG. 12B, the same effect produces force 36. The forces 35 and 36 on the grain 37 are not generally equal so there can be forces generated that are higher than first-order.

A third possible mechanism for nonlinear conversions involves the orientation of intersecting pores and the Bernoulli force. A typical pore structure would result in many intersections of pore paths at various angles. A simple example of a perpendicular intersection is illustrated in FIG. 18A in which the vertical pore 181 is aligned with the applied electric field 182. In this figure, induced upward fluid flow 183 in the vertical pore will give rise to a flow 186 and consequently a low pressure in the horizontal pore. FIG. 18B shows that a second pressure cycle 185 occurs when the direction of the external electric field 182 is reversed. Thus, the low pressure response, i.e., the constriction 185 of the horizontal pore due to the flow-induced low pressure inside the pore, will have double the input frequency (two pressure cycles for every input flow cycle). For this alternate nonlinear electroseismic mechanism, the response size would be related to fluid flow from a standard linear electroseismic conversion. (See U.S. Pat. No. 5,877,995 to Thompson, et al.) The Bernoulli mechanism is an alternate explanation for a seismic response that varies as the square of the input current and this mechanism might operate with or without the other second-order mechanisms.

As the preceding theory explains, nonlinear electroseismic response, just as with linear electroseismic response, will come from regions containing liquids or wet gases. In the case of the nonlinear response, the interpreter can often extract even more information. The additional information concerns the presence of oil or gas in addition to water. Hydrocarbons will produce greater seismic amplitudes than water, for the following reasons, beginning with a summary of the previously stated description of the basis for the nonlinear electroseismic effect.

The applied electric field will distort the dipole layers and move fluids in the pore spaces, resulting in pressure build-up. This pressure wave caused by fluid motion is the linear electroseismic effect. The result is that charges pile up on the boundaries and distortion reaches its limits, producing a macroscopic polarization. This polarization gives rise to an internal electric field which will oppose the applied field. The field seen internally is the applied field reduced by the induced field. This state of affairs is called dielectric polarization, and it is the basis of the nonlinear electroseismic effect.

Assume now that water in the pore spaces is partly replaced by oil. The oil will occupy the center of the pores, surrounded by water. The presence of oil increases the resistivity of the pore fluid. This increased resistivity reduces the leakage current, i.e., the backflow of current in response to the net internal electric field. In areas containing oil, the dielectric polarization is much stronger. In areas containing only water, the dielectric polarization is less because of the greater internal "short" tending to reduce it. The result of this difference is that regions containing oil produce larger electroseismic amplitudes than regions containing water only. This difference will often be apparent to the data interpreter.

The custom-designed waveforms taught above are the most efficient way to practice the present invention. However, the present invention may be practiced also by simply generating an electric field from any periodic waveform, injecting it into the ground, and then varying the frequency by regular increments and repeating the process. The recorded seismic waves can then be manipulated in processing steps, with the objective being to combine waves of varying frequencies to create a single pulse in a manner analogous to a Fourier series expansion.

The binary-coded waveforms taught by the present invention meet the requirements for electroseismic exploration stated previously. The need for large current levels is addressed since these are continuous waveforms instead of, for example, pulses that would have significant dead time. The use of simple 60 Hz (or constructed 3-phase) elements also allows large current levels and high electrical efficiency since the related hardware is simplified. The lack of DC is assured since each waveform element (e.g., a full cycle at 60 Hz) has no DC component (i.e., its mean value is zero); it follows, therefore, that a set of such elements would have no DC component. The frequency content of the source can be matched to the exploration target by adjusting the frequency of the waveform element. Finally, minimization of side lobes and discrimination against interference from linear electroseismic effects have been discussed at length.

To further explain the preceding statement about adjusting the source frequency to achieve the desired depth penetration, neither the source wave nor the return (squared) seismic response is composed of a single frequency. The phase inversions and the zeroing of certain elements, plus the squaring aspect of the conversion mechanism, produce waves composed of many frequencies in the sense of their Fourier analysis decomposition. This is necessary to the invention, i.e., that the waves have a finite bandwidth of frequencies. If the seismic return wave were a single frequency, there would be no wave that would cross correlate with it to produce a localized pulse in the processing step. A bandwidth of frequencies is needed to produce the desired spike. Elementary Fourier analysis teaches that the sharper the spike, the wider the needed bandwidth. Thus, although the source and return waves each have a spread of frequencies, it is reasonable to expect, and Fourier decomposition can prove, that the frequency distribution of both waves will peak near the frequency of the building block, the waveform element. Thus the desired subsurface penetration may be achieved by varying the frequency of the waveform element.

The foregoing description is directed to particular embodiments of the present invention for the purpose of illustrating it. It will be apparent, however, to one skilled in the art, that many modifications and variations to the embodiments described herein are possible. For example, other source waveform elements (such as a saw tooth wave element) and binary sequences can be used as long as they satisfactorily meet the five requirements listed above. As noted previously, correlation side lobe amplitude varies inversely with the length of the extended waveform segment for any pseudo-random waveform. Thus, there are many possible choices of waveform element and binary sequencing that will give satisfactory results within the framework of the present invention as described above. Moreover, the present invention does not require that the source waveform be generated by binary sequencing of a single waveform element, or by binary sequencing in any manner. Also, the present invention has other potential applications besides surface seismic, such as well logging and crosshole tomography. (See U.S. Pat. No. 5,877,995.) All such modifications and variations are intended to be within the scope of the present invention, as defined in the appended claims.

We claim:

1. A method for electroseismic prospecting of a subterranean formation, said method comprising the steps of:
   (a) selecting a source waveform and a reference waveform, said source and reference waveforms being selected (i) to reduce amplitudes of side lobes produced by correlation of the square of the source waveform with the reference waveform, and (ii) to reduce interference between said correlation and a correlation of the source waveform with the reference waveform;
   (b) generating the source waveform as an electrical signal and transmitting it into the subterranean formation;
   (c) detecting and recording seismic signals resulting from conversion of the electrical energy into seismic energy in the subterranean formation; and
   (d) correlating the recorded seismic signals with the reference waveform.

2. The method of claim 1, wherein said source waveform and said reference waveform are constructed from a single element, said element consisting of a single full cycle of a preselected periodic waveform, said elements being pieced together with polarities sequentially specified by a preselected digital code, said periodic waveform having a frequency predetermined to give desired depth penetration of said subterranean formation.

3. The method of claim 2, wherein the waveform element is a single cycle of a 60 Hz sinusoid.

4. The method of claim 2, wherein the waveform element is constructed from selected phases of a three-phase power supply to have a desired frequency less than or equal to 60 Hz.

5. The method of claim 2, wherein said digital code is a maximal length shift-register $\{1,-1\}$ sequence with the resulting source waveform modified to a $\{1,0\}$ sequence by zeroing the negative polarity elements; said reference waveform is the square of the source waveform before the negative polarity elements are zeroed, said squared wave then undergoing polarity reversal of segments corresponding to "−1" terms in said maximal length shift-register sequence; and said correlation is circular correlation.

6. The method of claim 5, wherein said interference reduction is accomplished by constructing a second source waveform by reversing the polarity of the source waveform selected in step (a), repeating steps (b)–(d) with said second source waveform, and then adding together the correlated seismic signals resulting from the two source waveforms.

7. The method of claim 5, wherein said interference reduction is accomplished by replacing some pre-selected "1" terms in said $\{1,0\}$ source wave coding sequence with "1" terms, said replacement being designed to substantially maximize the time separation between said correlation of the source waveform and said correlation of the square of the source waveform.

8. The method of claim 7, wherein which "1" terms to replace with −1 are determined by multiplying said $\{1,0\}$ sequence by a circularly rotated version of said maximal length shift-register $\{1,-1\}$ sequence, thereby generating the desired $\{1,-1,0\}$ code.

9. The method of claim 5, wherein the degree of said maximal length shift-register sequence is sufficiently large to reduce said side lobe amplitudes to a predetermined level.

10. The method of claim 5, wherein said transmitting of said source waveform into said subterranean formation is repeated a sufficient number of times to reduce loss of information due to said circular correlation to a predetermined level.

11. The method of claim 7, wherein said interference reduction is further accomplished by constructing a second source waveform by reversing the polarity of the source waveform selected in step (a), repeating steps (b)–(d) with said second source waveform, and then adding together the correlated seismic signals resulting from the two source waveforms.

12. The method of claim 1, wherein said reference waveform is bandpass filtered to conform to the expected frequency content of said recorded seismic signals.

13. The method of claim 1, further comprising the following additional step:
   (e) ordering the seismic signals from the subterranean formation by amplitude, and interpreting any substantially larger amplitudes to represent hydrocarbons.

14. A method for electroseismic prospecting of a subterranean formation, said method comprising the steps of:
   (a) selecting a periodic waveform;
   (b) generating said waveform as an electrical signal and transmitting it into said subterranean formation at a preselected frequency;
   (c) detecting and recording seismic signals resulting from conversion of the electrical energy into seismic energy in said subterranean formation;
   (d) Fourier transforming said seismic signals from the time domain to the frequency domain;
   (e) collecting the transformed data at twice the signal frequency, and extracting amplitude and phase information;
   (f) repeating steps (b)–(e) for a plurality of different signal frequencies; and
   (g) inverse Fourier transforming the extracted amplitude and phase information of step (e) back to the time domain.

15. An electrical signal for use in electroseismic prospecting of a subterranean formation, said signal having a waveform constructed from a single element, said element consisting of a single full cycle of a preselected periodic waveform, said periodic waveform having a frequency predetermined to give desired depth penetration of said subterranean formation, said elements being pieced together with polarities sequentially specified by a preselected digital code, said digital code being chosen to substantially minimize side lobes resulting from correlation of the square of the signal waveform with a reference waveform, said reference waveform also being chosen to substantially minimize said side lobes, said digital code and said reference waveform also being chosen to reduce interference with said correlation from a correlation of the signal waveform with said reference waveform.

16. The electrical signal of claim 15, wherein said waveform element is a single cycle of a 60 Hz sinusoid.

17. The electrical signal of claim 15, wherein said waveform element is constructed from selected phases of a three-phase power supply to have a desired frequency less than or equal to 60 Hz.

18. The electrical signal of claim 15, wherein said digital code is a maximal length shift-register $\{1,-1\}$ sequence with the resulting signal waveform modified such that the negative polarity elements are zeroed, said reference waveform is the square of the signal waveform before the negative polarity elements are zeroed, said squared wave then undergoing polarity reversal of squared elements corresponding to "−1" terms in said maximal length shift register sequence to yield said reference waveform, and said correlation is circular correlation.

19. The electrical signal of claim 15, wherein said digital code is a $\{1,-1\}$ sequence derived from a maximal length shift-register {1,-1} sequence by first modifying said {1,-1} sequence to replace all "-1" terms with 0, then modifying the resulting {1,0} sequence to replace some preselected "1" terms with -1, said replacement of "1" terms with -1 being determined so as to reduce said interference by substantially maximizing the resulting time separation between the correlations of the signal waveform and of the square of the signal waveform with said reference waveform, said reference waveform being constructed by repeating said element the same number of cycles as in said signal waveform, then squaring the resulting waveform, then reversing the polarity of those squared elements corresponding to "1" terms in said {1,-1} sequence; and said correlation is circular correlation.

20. The electrical signal of claim 19, wherein the replacement of "1" terms with -1 is accomplished by multiplying said {1,-1,0} sequence term-by-term by a circularly rotated version of said {1,-1} maximal length shift-register sequence.

21. The electrical signal of claim 18, wherein the degree of said maximal length shift-register sequence is sufficiently large to reduce said side lobe amplitudes to a predetermined level, and said reference waveform is modified by subtracting any low frequency components, including DC.

22. An electric signal generator for generating waveforms for use as source signals to be injected into the ground in electroseismic prospecting for hydrocarbons, comprising:

(a) a signal generator adapted to take AC input and convert it to a preselected output waveform suitable for electroseismic prospecting, said generator having a plurality of switches to shape said output waveform and at least one transformer to control the voltage of said output waveform;

(b) a controller means having a computer and being connected to and controlling said switches and being connected to and monitoring said AC input, said computer being programmable to cause said switches to select phase and voltage levels from said AC input to produce said preselected output waveform and a corresponding reference waveform; and (c) an interface means connected to said controller means and having terminals for connection to a seismic data acquisition system, said interface means adapted to (1) synchronize the start of seismic data acquisition with the start of the waveform generated by said signal generator, and (2) send said reference waveform to the seismic data acquisition system for use in data processing.

23. An electric signal generator for generating waveforms for use as source signals to be injected into the ground in electroseismic prospecting for hydrocarbons, said generator having a positive output terminal, a negative output terminal and a common output terminal, comprising:

(a) three transformers, each having a primary winding and a secondary winding, said primary windings having terminals for connection to, respectively, the three phases of a three-phase AC power source, said secondary windings each having two ends and a center tap;

(b) six controllable switching means, each switching means having one input and two output terminals, each switching means being connected at its input terminal to a different end of the three secondary windings, one output terminal of each switching means being connected together and to said positive generator output terminal, the other output terminal of each switching means being connected together and to said negative generator output terminal, and said common output terminal of the generator being connected to the center taps of the three secondary windings;

(c) a controller means connected to each of the six switching means, said controller means having computer means sending signal voltages to each of said switching means causing each output terminal of said switching means to be connected or not to the input terminal of said switching means according to said signal generated by said computing means, said computing means being programmable to define a desired waveform and a processing reference waveform, said controller means being also connected to said primary winding terminals with said computing means monitoring such input information to select phase and voltage levels needed to produce the desired waveform; and (d) an interface means connected to said controller means and having terminals for connection to a seismic data acquisition system, said interface means adapted to (1) synchronize the start of seismic data acquisition with the start of the waveform generated by said signal generator, and (2) send said processing reference waveform to the seismic data acquisition system for use in later data processing.

24. A method for electroseismic delineation of a subterranean petroleum-bearing formation comprising the steps of:

(a) selecting a source waveform and a reference waveform, said source and reference waveforms being selected (I) to reduce amplitudes of side lobes produced by correlation of the square of the source waveform with the reference waveform, and (ii) to reduce interference between said correlation and a correlation of the source waveform with the reference waveform;

(b) generating the source waveform as an electrical signal and transmitting it through at least two electrodes into the subterranean formation;

(c) detecting with one or more seismic receivers and recording seismic signals resulting from conversion of the electrical energy into seismic energy in the subterranean formation; and (d) correlating the recorded seismic signals with the reference waveform.

25. The method of claim 24, wherein at least one electrode is located in a borehole penetrating the surface in the vicinity of said subterranean formation.

26. The method of claim 24, wherein at least one of said seismic receivers is located in a borehole penetrating the surface in the vicinity of said subterranean formation.

27. The method of claim 24, wherein at least one electrode and at least one seismic receiver are located in a single borehole penetrating the surface in the vicinity of said subterranean formation.

28. The method of claim 24, wherein at least one electrode is located in one borehole and at least one receiver is located in a second borehole, both boreholes penetrating the surface in the vicinity of said subterranean formation.

29. A method of producing hydrocarbons from a subterranean formation comprising steps of:

(a) selecting a source waveform and a reference waveform, said source and reference waveforms being selected (i) to reduce amplitudes of side lobes produced by correlation of the square of the source waveform with the reference waveform, and (ii) to reduce interference between said correlation and a correlation of the source waveform with the reference waveform;

(b) generating the source waveform as an electrical signal and transmitting it into the subterranean formation;

(c) detecting and recording seismic signals resulting from conversion of the electrical energy into seismic energy in the subterranean formation;

(d) correlating the recorded seismic signals with the reference waveform;

(e) using the information from step (d) to assess the commercial hydrocarbon potential of the subterranean formation; and (f) producing any hydrocarbons identified in step (e).

* * * * *